(12) United States Patent
Zhu et al.

(10) Patent No.: US 11,981,815 B2
(45) Date of Patent: May 14, 2024

(54) NETWORKED SILICONES AND RELATED COMPOSITIONS, METHODS, AND COMPOUNDS

(71) Applicant: DOW SILICONES CORPORATION, Midland, MI (US)

(72) Inventors: Bizhong Zhu, Midland, MI (US); Kaila M. Mattson, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 87 days.

(21) Appl. No.: 17/764,700

(22) PCT Filed: Sep. 24, 2020

(86) PCT No.: PCT/US2020/052428
§ 371 (c)(1),
(2) Date: Mar. 29, 2022

(87) PCT Pub. No.: WO2021/067109
PCT Pub. Date: Apr. 8, 2021

(65) Prior Publication Data
US 2022/0411587 A1 Dec. 29, 2022

Related U.S. Application Data

(60) Provisional application No. 62/907,910, filed on Sep. 30, 2019.

(51) Int. Cl.
| | | |
|---|---|---|
| *C08L 83/08* | (2006.01) | |
| *C08G 77/04* | (2006.01) | |
| *C08J 3/24* | (2006.01) | |
| *C08L 83/06* | (2006.01) | |
| *C09D 183/06* | (2006.01) | |
| *C09D 183/08* | (2006.01) | |

(52) U.S. Cl.
CPC .............. *C08L 83/08* (2013.01); *C08G 77/04* (2013.01); *C08J 3/24* (2013.01); *C08L 83/06* (2013.01); *C09D 183/06* (2013.01); *C09D 183/08* (2013.01)

(58) Field of Classification Search
None
See application file for complete search history.

(56) References Cited

U.S. PATENT DOCUMENTS

| | | | |
|---|---|---|---|
| 5,691,435 A | 11/1997 | Herzig et al. | |
| 2005/0272881 A1* | 12/2005 | Blok | C08G 77/48 525/477 |
| 2017/0015864 A1 | 1/2017 | Yamamoto et al. | |
| 2020/0362067 A1 | 11/2020 | Okamura | |

FOREIGN PATENT DOCUMENTS

| | | |
|---|---|---|
| JP | 2019099472 A | 6/2019 |
| WO | 2019107117 A1 | 6/2019 |

OTHER PUBLICATIONS

"Novel Polymer Systems with Very Bulky Organosilicon Side Chain Substituents" authored by Kowalewska et al. and published in Polymer (1999) 40, 813-818.*
Product data sheet for HAM-301 ( no date).*
"New Dendritic Systems based on Sterically-hindered Carbosilane Units—Synthesis and Application" authored by Kowalewska et al. and published in ARKIVOC 2006 (v) 110-115.*
International Search Report for PCT/US2020/052428 dated Jan. 11, 2021, 4 pages.
Vallejo-Montesinos, Javier et al., "Study of polymer-solvent interactions of complex polysiloxanes using dissipative particle dynamics", Journal of Macromolecular Science, Part B: Physics (2018), 57(9), 624-644.
Kohjiya, Shinzo et al., "Hydrosilylation of mesogens having carbon-carbon double bonds with poly(methyl hydrosiloxanes)", Polymer-Plastics Technology and Engineering (1991), 30(4), 351-66.
Stern, S.A. et al., "Structure-permeability relationships in silicone polymers", Journal of Polymer Science, Part B: Polymer Physics (1987), 25(6), 1263-98.
Roller, M.B. and Gillham, J.K., "High-temperature elastomers. Systematic series of linear poly(carborane-siloxane)s containing icosahedral (-CB10H10C-) cages", Journal of Applied Polymer Science (1973), 17(7), 2141-72.
Li, Zhongjing et al., "Polyphosphazenes featuring pyrene side group: Synthesis, photophysics, and intra- / inter-chain interactions", Abstracts of Papers, 254th ACS National Meeting & Exposition, Washington, DC, USA, Aug. 20-24, 2017 (2017), PMSE-171.
Modzelewski, Tomasz et al., "Elastomeric Polyphosphazenes with Phenoxy-Cyclotriphosphazene Side Groups", Macromolecules (Washington, DC, United States) (2015), 48(20), 7543-7549.

(Continued)

*Primary Examiner* — Marc S Zimmer
(74) *Attorney, Agent, or Firm* — Warner Norcross + Judd LLP

(57) ABSTRACT

A networked silicone is disclosed. The networked silicone comprises crosslinked strands of hindered organosilicon compounds. A composition for preparing the networked silicone is also disclosed, and comprises (A) a hindered organosilicon compound, (B) a crosslinking compound, and optionally (C) a catalyst. Additionally, a method of preparing the networked silicone is disclosed, and comprises reacting the hindered organosilicon compound (A) and the crosslinking compound (B), optionally in the presence of the catalyst (C), to give the networked silicone. A reaction product comprising the networked silicone is also disclosed. The reaction product is prepared from the composition and/or in accordance with the method, and may be a cured product. Additionally, a composite article and a method of forming the same are disclosed. The composite article is formed by disposing a networked silicone composition on the substrate and curing the networked silicone composition, thereby preparing the composite article.

17 Claims, No Drawings

(56) References Cited

OTHER PUBLICATIONS

Allcock, Harry et al., "New approaches to hydrophobic polyphosphazene elastomers and IPN's", Abstracts of Papers, 252nd ACS National Meeting & Exposition, Philadelphia, PA, United States, Aug. 21-25, 2016 (2016), POLY-400.

Wrana, Claus et al., "Therban—the high performance elastomer for the new millennium", Macromolecular Materials and Engineering (2001), 286(11), 657-662.

Machine-assisted translation of KR1020140042249A, obtained from https://patents.google.com/ on Oct. 12, 2022, & pages.

* cited by examiner

NETWORKED SILICONES AND RELATED COMPOSITIONS, METHODS, AND COMPOUNDS

CROSS-REFERENCE TO RELATED APPLICATIONS

This application is the U.S. National Stage of International Application No. PCT/US2020/052428 filed on 24 Sep. 2020, which claims priority to and all advantages of U.S. Provisional Patent Application No. 62/907,910 filed on 30 Sep. 2019, the content of which is incorporated herein by reference.

FIELD OF THE INVENTION

The present disclosure generally relates to siloxane-containing networks and, more specifically, to compositions and methods for preparing a networked silicone and compositions and articles prepared therewith.

DESCRIPTION OF THE RELATED ART

Silicones are polymeric materials used in numerous commercial applications, primarily due to significant advantages they possess over their carbon-based analogues. More precisely called polymerized siloxanes or polysiloxanes, silicones have an inorganic silicon-oxygen backbone chain ( . . . —Si—O—Si—O—Si—O— . . . ) with organic side groups attached to the silicon atoms. Organic side groups may be used to link two or more of these backbones together. By varying the —Si—O— chain lengths, side groups, and crosslinking, silicones can be synthesized with a wide variety of properties and compositions. They can vary in consistency from liquid to gel to rubber to hard plastic.

Siloxane-based materials are known in the art and are utilized in myriad end use applications and environments. For example, organopolysiloxanes are utilized in numerous industrial, home care, and personal care formulations. However, the use of organopolysiloxanes in certain applications that may benefit from their particular attributes (e.g. low-loss and stable optical transmission, thermal and oxidative stability, etc.) remains limited due to the weak mechanical properties of conventional silicone networks manifesting in low tensile strength, tear strength, modulus, and mechanical energy storage/dissipation before fracture. In order to improve such mechanical properties, certain reinforcement methods have been developed. For example, some conventional silicone elastomers/rubbers include reinforcing fillers to increase their mechanical robustness. Unfortunately, however, these reinforced silicone rubbers are still significantly weaker than many organic polymer-based elastomers and rubbers. Additionally, many conventional reinforcing methods result in silicones with compromised optical properties, rendering such methods incompatible with applications involving the low-loss and stable optical transmission expected from silicone materials.

BRIEF SUMMARY OF THE INVENTION

A composition for preparing a networked silicone (the "composition") is disclosed. The composition comprises (A) a hindered organosilicon compound, (B) a crosslinking compound, and optionally (C) a catalyst. The hindered organosilicon compound (A) comprises a siloxane moiety having the general formula (I):

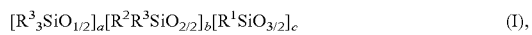

$[R^3{}_3SiO_{1/2}]_a[R^2R^3SiO_{2/2}]_b[R^1SiO_{3/2}]_c$  (I), where each $R^1$ is an independently selected hydrocarbyl group; each $R^2$ is independently $R^1$ or a blocking group comprising a branched hydrocarbon group having from 7 to 3000 carbon atoms and/or a branched organosilicon group having from 3 to 1000 silicon atoms, with the proviso that at least one $R^2$ is the blocking group; each $R^3$ is independently $R^1$ or a cross-linkable group, with the proviso that at least one $R^3$ is the cross-linkable group; and subscripts a, b, and c are each mole fractions such that a+b+c=1, with the provisos that $0 \leq a < 1$, $0 < b \leq 1$, and $0 \leq c < 1$. The crosslinking compound (B) has the general formula $R^6$-L-$R^6$, where L is a linking group and each $R^6$ is an independently selected functional group reactive with the cross-linkable group $R^3$ of the hindered organosilicon compound (A).

A method of preparing a networked silicone (the "preparation method") is also provided. The preparation method comprises reacting the hindered organosilicon compound (A) and the crosslinking compound (B), optionally in the presence of the catalyst (C), to give the networked silicone.

A networked silicone and a reaction product comprising the networked silicone, each prepared from the composition and/or in accordance with the method, are also provided. The reaction product may be a cured product.

A composite article and a method of forming a composite article (the "formation method") are also provided. The composite article comprises the reaction product or the cured product comprising the networked silicone disposed on the substrate. The formation method comprises disposing the composition for preparing a networked silicone on a substrate, and curing the composition to give the networked silicone on the substrate, thereby forming the composite article.

DETAILED DESCRIPTION OF THE INVENTION

A networked silicone is provided. In general, the networked silicone is prepared with particular compositions and/or according to particular methods described below. Accordingly, as will be appreciated by those of skill in the art in view of the description and examples herein, the particular structure, properties, and characteristics of the networked silicone are a function of the components and methods utilized in preparing the same. The networked silicone comprises crosslinked strands of hindered organosilicon compounds. Without wishing to be bound by theory, it is believed that the particular structure of the networked silicone resists, but allows, strain, and dissipates mechanical energy though a moveable intermeshing/interdigitation mechanism that includes a mechanical-type interaction between blocking groups providing steric bulk and cross-linking groups bound to the organosilicon strands. As described herein, the networked silicone may be prepared having low-loss and stable optical transmission, high thermal and oxidative stability, and tough mechanical properties manifesting in increased tensile strength, strain, tear strength, modulus, and mechanical energy storage/dissipation before fracture. The networked silicone is not particularly limited, and will be understood by those of skill in the art in view of the compositions and methods described below.

A composition for preparing the networked silicone (the "composition") is also disclosed. The composition, and the networked silicone prepared therewith, may be utilized in diverse end use applications. For example, the composition may be utilized to prepare networked silicones as an elastomeric compositions, as well as cured products and/or composite articles comprising the same. Such elastomeric compositions may be utilized in or as components of functional devices, such as waveguides for optical components, as described herein.

The composition comprises (A) a hindered organosilicon compound, (B) a crosslinking compound, and, optionally, (C) a catalyst, which are each described in further detail below.

In general, the hindered organosilicon compound (A) is an organosilicon compound comprising a siloxane moiety having an organosiloxane-containing backbone, one or more pendant blocking groups, and one or more cross-linkable groups. In some embodiments, the hindered organosilicon compound (A) may be defined as a graft polymer and/or a "brush" or "brush-type" polymer, as will be understood by those of skill in the art in view of the description herein.

As introduced above, the hindered organosilicon compound (A) comprises a siloxane moiety. For clarity and ease of reference, the siloxane moiety of the hindered organosilicon compound (A) is given the designation "Y" herein, and thus may be referred to as the "siloxane moiety Y" below.

The siloxane moiety Y has the general formula (I):

$$[R^3{}_3SiO_{1/2}]_a[R^2R^3SiO_{2/2}]_b[R^1SiO_{3/2}]_c \quad (I),$$

where each $R^1$ is an independently selected hydrocarbyl group; each $R^2$ is independently $R^1$ or a blocking group comprising a branched hydrocarbon group having from 7 to 3000 carbon atoms and/or a branched organosilicon group having from 3 to 1000 silicon atoms, with the proviso that at least one $R^2$ is the blocking group; each $R^3$ is independently $R^1$ or a cross-linkable group, with the proviso that at least one $R^3$ is the cross-linkable group; and subscripts a, b, and c are each mole fractions such that a+b+c=1, with the provisos that $0 \le a < 1$, $0 < b \le 1$, and $0 \le c < 1$.

As will be understood by those of skill in the art, the mole fractions represented by subscripts a, b, c in the general formula (I), which are described in further detail below, correspond to the relative amount of each type of siloxy or siloxane unit in the organosiloxane-containing backbone of the siloxane moiety Y. In particular, general formula (I) generally comprises [M], [D], and optionally [T] siloxy units. More specifically, as understood in the art, siloxy groups include [M], [D], [T], and [Q] units, which represent structural units of individual functionality present in organopolysiloxane moieties and organopolysiloxanes. More specifically, [M] represents the monofunctional unit of general formula $R_3SiO_{1/2}$; [D] represents the difunctional unit of general formula $R_2SiO_{2/2}$; [T] represents the trifunctional unit of general formula $RSiO_{3/2}$; and [Q] represents the tetrafunctional unit of general formula $SiO_{4/2}$, as shown by the general structural moieties below:

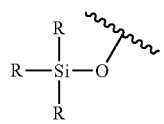

[M]

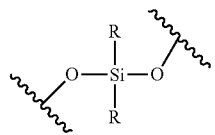

[D]

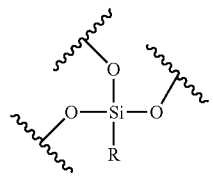

[T]

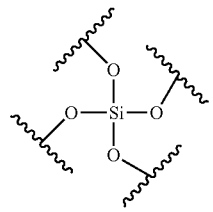

[Q]

In these general structural moieties, each R is independently a monovalent or polyvalent substituent. As understood in the art, specific substituents suitable for each R are not limited, and may be monoatomic or polyatomic, organic or inorganic, linear or branched, substituted or unsubstituted, aromatic, aliphatic, saturated or unsaturated, and combinations thereof. Typically, each R is independently selected from hydrocarbyl groups and siloxy groups. The hydrocarbyl group(s) represented by R, when present, may be substituted or unsubstituted, and may be aliphatic, aromatic, cyclic, alicyclic, etc., as described below with respect to the examples of hydrocarbyl groups suitable for $R^1$. The siloxy group(s) represented by R, when present, may be substituted or unsubstituted, and may comprise, alternatively may be, any combination of [M], [D], [T], and [Q] units.

With respect to silicon compounds described herein, (e.g. the hindered organosilicon compound (A) and, in particular, the siloxane moiety Y thereof), the presence and proportion of [M], [D], [T], and/or [Q] units is independently selected, as is the particular substituent for each R of any particular siloxy unit (e.g. those indicated by subscripts a, b, and c in general formula (I), etc.). For example, a proportion of [T] and [Q] units of or around 0 is typically selected to increase the linearity of organopolysiloxane moieties and organopolysiloxanes. Such organopolysiloxane moieties and organopolysiloxanes are typically linear or substantially linear, but may include some branching attributable to [T] and/or [Q] units (e.g. where c>0 with respect to general formula (I), etc.). Conversely, the proportion of [T] and/or [Q] units is typically selected to be greater than 0 when an organopolysiloxane moiety or organopolysiloxane is a resin or otherwise branched. Accordingly, one of skill in the art will select the composition of siloxane-containing silicon compounds in view of the parameters and embodiments described herein to control the composition of the silicon compounds described herein in general, and thus the hindered organosilicon compound (A) in particular, e.g. based on a desired property of a particular hindered organosilicon compound (A) or a networked silicone to be prepared therewith.

With regard to the siloxane moiety Y, each $R^1$ in general formula (I) is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., $R^1$ may include one or more heteroatoms (oxygen, sulfur, nitrogen, etc.) within a carbon chain), or both. As such, it will be appreciated that $R^1$ may comprise, or be, a hydrocarbon moiety having one or more substituents in and/or on (i.e., appended to and/or integral with) a carbon chain/backbone thereof, such that $R^1$ may comprise, or be, an ether, an ester, etc.

In general, hydrocarbyl groups suitable for $R^1$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. isopropyl and/or n-propyl), butyl (e.g. isobutyl, n-butyl, tert-butyl, and/or sec-butyl), pentyl (e.g. isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each $R^1$ is an independently selected substituted or unsubstituted hydrocarbyl group. For example, in some embodiments each $R^1$ is independently selected from unsubstituted hydrocarbyl groups, such as linear or unbranched unsubstituted hydrocarbyl groups.

Each $R^1$ may be the same as or different from any other $R^1$ of the siloxane moiety Y (e.g. with respect to composition, substitution, chirality, etc.). In certain embodiments, each $R^1$ is the same as each other $R^1$ of the siloxane moiety. In other embodiments, at least one $R^1$ is different from at least one other $R^1$ of the siloxane moiety. In some embodiments, each $R^1$ is an independently selected hydrocarbyl group having from 1 to 12, alternatively from 1 to 8, alternatively from 1 to 6, carbon atoms. In these or other embodiments, each $R^1$ is independently selected from alkyl groups, such as methyl groups, ethyl groups, etc. In certain embodiments, each $R^1$ is methyl.

As introduced above, the hindered organosilicon compound (A) comprises a pendant blocking group (i.e., bonded to a silicon atom of the backbone of the siloxane moiety Y). More specifically, with regard to general formula (I), at least one $R^2$ is the blocking group. However, as described in further detail below, each other $R^2$ of the siloxane moiety Y may be, independently, $R^1$ or the blocking group. For clarity and ease of reference, the blocking group of the siloxane moiety Y is given the designation "X" herein, and thus may be referred to as the "blocking group X" below.

In general, the blocking group X is a branched moiety comprising organic and/or silicon groups, and is not particularly limited. Typically, the blocking group X comprises, alternatively is, a branched hydrocarbon group, a branched organosilicon group, or a combination thereof.

Examples of branched hydrocarbon groups generally include hydrocarbon groups having hydrocarbon chains and pendant hydrocarbyl groups (e.g. such as any of the hydrocarbyl groups described above with respect to $R^1$) bonded thereto, as will be understood by those of skill in the art. Such branched hydrocarbon groups may contain any degree of branching, and thus include minimally-branched hydrocarbon groups (i.e., those including but one or two branches, e.g. from one tertiary carbon atom, or one quaternary or two tertiary carbon atoms, etc.), highly-branched hydrocarbon groups (i.e., those include five, six, or more branches), etc. Branched hydrocarbon groups suitable for use in/as the blocking group X may be unsubstituted (i.e., aside from pendant groups) or substituted (e.g. as described above with respect to $R^1$), cyclic or acyclic, etc. Likewise, suitable branched hydrocarbon groups may comprise any type of carbon functionality (i.e., in the hydrocarbon chain(s) and/or the pendant hydrocarbyl group(s)), such as alkyl, alkenyl, alkynyl, aryl, and/or aralkyl functionality, and the like, as well as combinations thereof. When utilized, the branched hydrocarbon group is typically selected to provide steric bulk to the blocking group X, i.e., beyond that which is exhibited by the hydrocarbyl group $R^1$. As such, as will be understood by those of skill in the art, branched hydrocarbon groups may comprise any number of carbon atoms, such as from 5 to 5000, alternatively from 6 to 4000, alternatively from 7 to 3000 carbon atoms. In some embodiments, the blocking group X comprises a branched hydrocarbon group having from 7 to 100 carbon atoms, alternatively from 8 to 90, alternatively from 9 to 80, alternatively from 10 to 70, alternatively from 11 to 60, alternatively from 12 to 50, alternatively from 15 to 50, alternatively from 25 to 50 carbon atoms. In other embodiments, the blocking group X comprises a branched hydrocarbon group having from 100 to 3000 carbon atoms, such as from 100 to 2500, alternatively from 200 to 2500, alternatively from 300 to 2500, alternatively from 400 to 2500, alternatively from 500 to 2500, alternatively from 500 to 2000, alternatively from 500 to 1000 carbon atoms. However, it is to be appreciated that the blocking group X may comprise a branched hydrocarbon group having a number of carbon atoms outside these particular ranges, e.g. when the branched hydrocarbon group is highly-substituted, when the blocking group X comprises another branched hydrocarbon group and/or the branched organosilicon group, etc. Specific examples of branched hydrocarbyl groups suitable for the blocking group X 1-methylbutyl groups, 2-ethylpentyl groups, 2-methylhexyl groups, 5-methylheptyl groups, 4,4'-dimethylheptyl groups, 6-methyloctyl groups, and the like, as well as combinations thereof.

Examples of branched organosilicon groups generally include organosilicon groups having silicon-atom containing chains (e.g. siloxanes) and pendant silicon-atom containing groups (e.g. siloxane groups, silyl groups, etc.)

bonded thereto, as will be understood by those of skill in the art. However, the branched organosilicon groups are not particularly limited, and may include, for example, hydrocarbon chains with pendant silicon-atom containing groups bonded thereto, silicon-atom containing chains with pendant hydrocarbyl groups bonded thereto, organosiloxanes free from carbon atoms in the backbone and/or pendant group(s), etc. Such branched organosilicon groups may contain any degree of branching, and thus include minimally-branched organosilicon groups (i.e., those including but one or two branches, e.g. from one [T] siloxy unit, one [Q] siloxy unit, or two [T] siloxy units, etc.), highly-branched organosilicon groups (i.e., those include five, six, or more branches), hyper-branched organosilicon groups, dendritic organosilicon groups, etc. As with the branched hydrocarbon groups, branched organosilicon groups suitable for use in/as the blocking group X may be unsubstituted (i.e., aside from pendant groups) or substituted (e.g. with divalent organic groups between siloxy units in a backbone/chain and/or pendant group, etc.).

When utilized, the branched organosilicon group is typically selected to provide steric bulk to the blocking group X, i.e., beyond that which is exhibited by the hydrocarbyl group $R^1$. As such, as will be understood by those of skill in the art, branched organosilicon groups may comprise any number of silicon atoms, such as from 3 to 3000, alternatively from 5 to 2000, alternatively from 7 to 1000 silicon atoms. In some embodiments, the blocking group X comprises a branched organosilicon group having from 3 to 100 silicon atoms, alternatively from 4 to 90, alternatively from 5 to 80, alternatively from 6 to 70, alternatively from 7 to 60, alternatively from 8 to 50, alternatively from 9 to 50, alternatively from 10 to 50 silicon atoms. In other embodiments, the blocking group X comprises a branched organosilicon group having from 100 to 3000 silicon atoms, such as from 100 to 2500, alternatively from 100 to 2000, alternatively from 100 to 1500, alternatively from 100 to 1000, alternatively from 100 to 750, alternatively from 100 to 500 silicon atoms. However, it is to be appreciated that the blocking group X may comprise a branched organosilicon group having a number of silicon atoms outside these particular ranges, e.g. when the branched organosilicon group is highly-substituted, when the blocking group X comprises another branched organosilicon group and/or the branched hydrocarbon group, etc.

In certain embodiments, the blocking group X comprises, alternatively is, a branched organosilicon compound having a siloxane moiety of formula $[R_mSiO_{(4-m)/2}]_o$, where subscript m is independently 0, 1, 2, 3, or 4 in each siloxy unit indicated by subscript o, subscript o is from 3 to 1000, and each R is as described above. In such embodiments, one R is typically a divalent linking group bonded to a silicon atom of the backbone of the siloxane moiety Y (e.g. in a siloxy unit indicated by subscript b in general formula (I)), each other R is independently selected from $R^1$, siloxy groups, and silyl groups, and subscript m is 3 or 4 in at least one siloxy unit indicated by subscript o. As will be appreciated by those of skill in the art in view of the description herein, specific examples of branched organosilicon groups suitable for use in/as the blocking group X include silicon dendrons and dendrimers, such as carbosilane dendrimers, carbosiloxane dendrimers, and the like, as well as derivatives, modifications, and combinations thereof.

In certain embodiments, the blocking group X comprises, alternatively is, a carbosiloxane dendrimer having the general formula (G): $-[D']_{p'}—Si(L')_{q'}(R^4)_{3-q'}$, where D' is a divalent linking group or atom, each L' is an independently selected organosilicon group, each $R^4$ is independently $R^1$ or $—OR^1$, subscript p' is 0 or 1, and subscript q' is 1, 2, or 3. In these embodiments, each organosilicon group L' independently comprises the formula $(G^x)$: $-[D^x]_p^x-Si(L^x)_q^x(R^4)_{3-q}^x$. More specifically, carbosiloxane dendrimers may be formed generationally, with each generation comprising a branch point (e.g. a branching silicon atom, such as from a [T] or [D] siloxy unit) beginning with the first branching silicon atom in general formula (G) and continuing with generations described by formula ($G^x$) (e.g. first ($G^i$) and, optionally, second ($G^{ii}$), third ($G^{iii}$), fourth ($G^{iv}$), fifth ($G^v$), sixth ($G^{vi}$), or higher generations). In each generation, with reference to formula ($G^X$), superscript X represents the particular generation being described, $D^X$ is a divalent linking group, each $L^X$ is an independently selected organosilicon group (e.g. of formula ($G^{X+1}$), corresponding to further generations), subscript $p^X$ is 0 or 1 (i.e., indicating the presence of optional divalent linking group $D^X$), superscript $q^X$ is 0, 1, 2, or 3, and $R^4$ is as defined above. For example, in certain embodiments, the carbosiloxane dendrimer comprises a first generation of branching, such that L' has the formula ($G^i$) and the carbosiloxane dendrimer has the general formula $-[D']_{p'}—Si(R^4)_{3-q'}(-[D']_p^i-Si(L')_q^i(R^4)_{3-q}^i)_{q'}$, where $D^i$, $L^i$, subscript $p^i$, and subscript $q^i$ are as defined above with respect to $D^X$, $L^X$, subscript $p^X$, and subscript $q^X$ of formula ($G^X$), respectively, and D', L', $R^4$, subscript p', and subscript q' are as defined above with respect to general formula (G).

It is to be appreciated that the carbosiloxane dendrimer may have any number of generations, such as from 2 to 20, alternatively from 2 to 18, alternatively from 3 to 18, alternatively from 3 to 16, alternatively from 3 to 15 generations. As will be understood by those of skill in the art, the final generation (i.e., "$G^{final}$") of the carbosiloxane dendrimer is, by nature, not a branch point, but instead describes a terminus of the carbosiloxane dendrimer. As such, in the final generation of carbosiloxane dendrimer (i.e., as described by a formula ($G^{final}$) corresponding to formula ($G^X$) above), each subscript $q^{(final)}$ is 0.

With regard to the carbosiloxane dendrimer as a whole (i.e., as described by formula (G), and modified by formula(s) ($G^X$) corresponding to each generation thereof), each divalent linking group D (e.g. D' and each $D^X$) is independently selected, when present, and is not particularly limited. Suitable divalent linking groups include divalent organic groups, divalent silicon groups, polyvalent or divalent atoms, such as oxygen, and the like, as well as derivatives, modifications, and combinations thereof. Organic groups suitable for use in/as the divalent linking group D may be substituted or unsubstituted, linear or branched, cyclic or acyclic, etc. Examples of such organic groups include hydrocarbon linking groups, such as divalent hydrocarbon groups having 1 to 30 carbon atoms, divalent derivatives and/or isomers of the hydrocarbyl groups described herein, and the like, and combinations thereof. Other examples of organic linking groups include organic polymer moieties, such as polyethers (e.g. polyoxyalkylenes), polyesters, etc. Examples of organosilicon groups suitable for use in/as the divalent linking group D include silyl and/or organosilyl linking groups, siloxane and/or organosiloxane linking groups divalent siloxanes, divalent silyl and/or organosilyl groups, and the like, or combinations thereof.

In some embodiments, each divalent linking group D comprises, alternatively is, a substituted or unsubstituted hydrocarbon group (e.g. a $C_1$-$C_{18}$ hydrocarbon group). In particular embodiments, divalent linking group D comprises, alternatively is, an alkylene group having the general formula —(CH$_2$)$_r$—, where subscript r is ≥1, such as from 1 to 18, alternatively from 1 to 16, alternatively from 1 to 12, alternatively from 1 to 10, alternatively from 1 to 8, alternatively from 1 to 6, alternatively from 2 to 6. In particular embodiments, subscript r is 3. In specific embodiments, each divalent linking group D comprises, alternatively is, a divalent hydrocarbyl group having the formula —(CH$_2$)$_2$—, —(CH$_2$)$_3$—, —CH(CH$_3$)CH$_2$—, or —CH$_2$CH(CH$_3$)CH$_2$—. In certain embodiments, each divalent linking group D comprises, alternatively is, a divalent organosiloxane group having the formula —[OSiR$^1_2$]$_n$—, where subscript n is selected such that 0<n≤100, and each R$^1$ is independently as defined above. Typically, D is an alkylene group when the carbosiloxane dendrimer is formed via hydrosilylation.

In other embodiments, D is an oxygen atom. Typically, D is an alkylene group when the carbosiloxane dendrimer is formed via condensation (or co-hydrolysis/condensation).

In certain embodiments, the blocking group X is selected to comprise a size equal to or greater than, alternatively greater than, a diameter of linking group L as described below with respect to the crosslinking compound (B). For example, as will be understood in view of the description below, when linking group L is a linear polydimethylsiloxane, the blocking group X is selected to comprise a size of at least 3 angstroms (Å). However, one of skill in the art will appreciate that the size of the blocking group X is not particularly limited with respect to an upper bound, but may comprise a size of greater than 3 Å, such as of at least 4, alternatively at least 5, alternatively at least 6, alternatively at least 10, alternatively at least 12, alternatively at least 15, alternatively at least 20 Å. The size of the blocking group X may be measured or calculated, by any method and/or techniques known in the art. For example, the size of the blocking group X may be calculated via a static model, an apparent diameter upon free rotation about a bond (i.e., accounting for the radius of gyration), etc., as will be understood by those of skill in the art.

As will be understood by those of skill in the art, each R$^2$ is independently selected in each moiety indicated by subscript b (i.e., in the siloxane moiety Y). As such, while at least one R$^2$ is the blocking group X, it is to be appreciated that the siloxane moiety Y, and thus the hindered organosilicon compound (A), may comprise any number of the blocking group X. For example, in some embodiments, the siloxane moiety Y, and thus the hindered organosilicon compound (A), comprises at least two, alternatively at least three, alternatively at least 5, alternatively at least 10 of the blocking group X.

As introduced above, the hindered organosilicon compound (A) comprises a cross-linkable group (i.e., bonded to a silicon atom of the backbone of the siloxane moiety Y). More specifically, with regard to general formula (I), at least one R$^3$ is the cross-linkable group. However, as described in further detail below, each other R$^3$ of the siloxane moiety Y may be, independently, R$^1$ or the cross-linkable group.

In general, the cross-linkable group of R$^3$ comprises, alternatively is, a functional group that may be used to crosslink the hindered organosilicon compound (A) with a multi-functional crosslinking compound (e.g. via a cross-linking reaction). For example, the cross-linkable group of R$^3$ may comprise, alternatively may be, a group reactive via a substitution reaction, an addition reaction, a coupling reaction, or combinations thereof. Specific examples of such reactions include nucleophilic substitutions, ring-opening additions, alkoxylations and/or transalkoxylations, hydrosilylations, olefin metatheses, condensations, radical couplings and/or polymerizations, and the like, as well as combinations thereof. As such, the cross-linkable group of R$^3$ may comprise, alternatively may be, a functional group that is hydrosilylatable (e.g. a silicon-bonded hydrogen atom, an alkenyl group, an alkynyl group, etc.), condensable (e.g. a hydroxyl group, a carboxyl group, an alkoxysilyl group, a silanol group, an amide group, etc., or a group that may be hydrolyzable and subsequently condensable), displaceable (e.g. a "leaving group" as understood in the art, such as a halogen atom, or other group stable in an ionic form and/or as a conjugate acid once displaced, or a functional group comprising such a leaving group, such as esters, anhydrides, amides, epoxides, etc.), nucleophilic (e.g. a heteroatom with lone pairs, an anionic or anionizable group, etc., such as a hydroxyl group, an amine group, a thiol group, a silanol group, a carboxylic acid group, group, etc.), electrophilic (e.g. isocyanates, epoxides, etc.), or various combinations thereof. One of skill in the art will appreciate that other cross-linkable groups may also be utilized in or as the cross-linkable group of R$^3$ as well. For example, in certain embodiments, the cross-linkable group of R$^3$ may comprise, alternatively may be, a functional group that is crosslinkable via cycloaddition reaction, such as an azide or alkyne capable of reacting with an alkyne or azide, respectively, in an azide-alkyne cycloaddition reaction.

In certain embodiments, the cross-linkable group of R$^3$ is the hydrosilylatable group and thus selected from olefinically-unsaturated groups (e.g. ethylenically unsaturated groups) and H. In some such embodiments, each hydrosilylatable group represented by R$^3$ is H, such that the hindered organosilicon compound (A) is silicon hydride-functional. In other of such embodiments, each hydrosilylatable group represented by R$^3$ is an ethylenically unsaturated group.

Examples of ethylenically unsaturated groups generally include substituted or unsubstituted hydrocarbon groups having at least one alkene or alkyne functional group. For example, in certain embodiments, R$^3$ comprises, alternatively is, an alkenyl group or an alkynyl group. Specific examples thereof include H$_2$C=CH—, H$_2$C=CHCH$_2$—, H$_2$C=CHCH$_2$CH$_2$—, H$_2$C=CH(CH$_2$)$_3$—, H$_2$C=CH(CH$_2$)$_4$—, H$_2$C=C(CH$_3$)—, H$_2$C=C(CH$_3$)CH$_2$—, H$_2$C=C(CH$_3$)CH$_2$CH$_2$—, H$_2$C=C(CH$_3$)CH$_2$CH(CH$_3$)—, H$_2$C=C(CH$_3$)CH(CH$_3$)CH$_2$—, H$_2$C=C(CH$_3$)C(CH$_3$)$_2$—, HC≡C—, HC≡CCH$_2$—, HC≡CCH(CH$_3$)—, HC≡CC(CH$_3$)$_2$—, and HC≡CC(CH$_3$)$_2$CH$_2$—. In specific embodiments, R$^3$ comprises, alternatively is, a vinyl group.

In certain embodiments, the cross-linkable group of R$^3$ comprises a hydrosilylatable moiety having the general formula -[D$^1$]$_d$—R$^5$, where each D$^1$ is an independently selected divalent group, such as any of those described herein; subscript d is 0 or from 1 to 10; and R$^5$ is a silicon-bonded hydrogen atom or an alkenyl group of formula —(R)C=CH$_2$, where R is as defined above. In some such embodiments, R is a hydrocarbyl group having from 1 to 6 carbon atoms, an alkoxy group, a silyl group, or H. In certain such embodiments, R is H or —CH$_3$. In these or other embodiments, subscript d≥1 and each divalent group D$^1$ is independently selected from substituted and unsubstituted hydrocarbon groups, siloxane groups, silyl groups, and combinations thereof.

In certain embodiments, the cross-linkable group of R$^3$ comprises, alternatively is, a condensable group. Examples of condensable groups generally include any functional group capable of undergoing a condensation reaction (e.g. such as those involving a coupling reaction yielding water, an alcohol, or other small molecule as a byproduct), as will be understood by those of skill in the art. Examples of such condensable groups include hydroxyl groups, carboxyl groups, alkoxyl groups, amide groups, ester groups, anhydride groups, siloxy groups, silanol groups, and the like, and combinations thereof. Some examples of condensable groups include functional groups that may be transformed (e.g. in situ) into a functional group capable of undergoing or otherwise reacting in a condensation reaction, such as halosilanes, alkyl halides, esters, amides, etc., which may be hydrolyzed prior to participating in a condensation reaction.

In certain embodiments, the cross-linkable group of $R^3$ comprises has the formula -$[D^2]_f$-$R^8$, where $R^8$ is a functional group capable of participating in a crosslinking reaction, $D^2$ is a divalent linking group (e.g. such as any of those described herein), and subscript f is 0 or 1. For example, in certain embodiments, the cross-linkable group of $R^3$ comprises, alternatively is, a group capable of participating in a thiol-ene or thiol-yne reaction. In such embodiments, $R^8$ is typically selected from ethylenically unsaturated groups (e.g. such as any of those described herein) and mercapto groups (i.e., group comprising, alternatively consisting of, an —S—H moiety). In other embodiments, the cross-linkable group of $R^3$ comprises, alternatively is, a group capable of participating in an amine-epoxide reaction, i.e., such that $R^8$ is selected from amine groups and epoxide groups. In certain embodiments, the cross-linkable group of $R^3$ comprises, alternatively is, a group capable of participating in an azide-alkyle cycloaddition reaction, i.e., such that $R^8$ is selected from azide groups and alkyne groups. In other embodiments, the cross-linkable group of $R^3$ comprises, alternatively is, a group capable of participating in a strain-promoted alkyne-nitrone cycloaddition ("SPANC") reaction, i.e., such that $R^8$ is selected from nitrones (e.g. 1,3-nitrones) and strained alkynes (e.g. cyclooctynes, such as diaryl-strained-cyclooctynes).

As will be understood by those of skill in the art, each $R^3$ is independently selected in each moiety indicated by subscript b (i.e., in the siloxane moiety Y). As such, while at least one $R^3$ is the cross-linkable group, it is to be appreciated that the siloxane moiety Y, and thus the hindered organosilicon compound (A), may comprise any number of the cross-linkable group $R^3$. Moreover, for example, in some embodiments, the siloxane moiety Y, and thus the hindered organosilicon compound (A), comprises at least two, alternatively at least three, alternatively at least 5, alternatively at least 10, alternatively at least 25, alternatively at least 50, alternatively at least 100 of the cross-linkable group $R^3$.

With continued regard to the siloxane moiety Y of the hindered organosilicon compound (A), it will be appreciated by those of skill in the art that the siloxy moieties indicated by subscripts a, b, and c in general formula (I) correspond to [M], [D], and [T] siloxy units, respectively, as introduced and described above. In general, $0 \le a<1$, $0<b \le 1$, and $0 \le c<1$. However, it is to be understood that each of these subscripts may vary widely within these ranges, and may be independently selected by those of skill in the art, as described in additional detail below.

Typically, the siloxane moiety Y comprises repeating [D] units, i.e., subscript b>0. For example, in certain embodiments, subscript b is a value of from greater than 0 to less than 1 (i.e., $0<b<1$), alternatively from 0.3 to less than 1 (i.e., $0.3 \le b<1$), such as from 0.3 to 0.9999, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript a is typically a value of from 0 to less than 1 (i.e., $0 \le a<1$), alternatively from 0 to 0.1 (i.e., $0 \le a \le 0.1$), such as from 0 to 0.099, alternatively from 0 to 0.09, alternatively from 0 to 0.085, alternatively from 0 to 0.08, alternatively from 0 to 0.075, alternatively from 0 to 0.07, alternatively from 0 to 0.065, alternatively from 0 to 0.06, alternatively from 0 to 0.055, alternatively from 0 to 0.05, alternatively from 0.001 to 0.05, alternatively from 0.002 to 0.05, alternatively from 0.005 to 0.01. Subscript c is typically a value of from 0 to less than 1 (i.e., $0 \le c<1$), alternatively from 0 to 0.7 (i.e., $0 \le c \le 0.7$), such as from 0 to 0.5, alternatively from 0 to 0.4, alternatively from 0 to 0.3, alternatively from 0 to 0.2, alternatively from 0 to 0.1, alternatively from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. In certain embodiments, the siloxane moiety Y comprises a linear siloxane segment, where $0.9 \le b<1$, $0 \le a \le 0.1$, and subscript c is 0. As described in further detail below, when the hindered organosilicon compound (A) comprises more than one siloxane moiety Y with repeating [D] units, the number of specific [D] units (i.e., the degree of polymerization, DP) in any one siloxane moiety Y is not limited.

As introduced above, in general formula (I) above, each $R^2$ is independently $R^1$ or the blocking group X, each $R^3$ is independently $R^1$ or the cross-linkable group, and each of the various groups represented by $R^1$, $R^2$, each $R^3$, and X are independently selected in each moiety indicated by subscript b. In certain embodiments, the siloxane moiety Y is free from, alternatively substantially free from, silicon atoms bonded to both cross-linkable group $R^3$ and blocking group X.

For example, in some such embodiments, the siloxane moiety Y has the general formula (II):

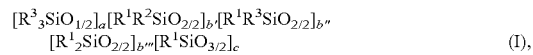

$$[R^3{}_3SiO_{1/2}]_a[R^1R^2SiO_{2/2}]_{b'}[R^1R^3SiO_{2/2}]_{b''}[R^1{}_2SiO_{2/2}]_{b'''}[R^1SiO_{3/2}]_c \quad (I),$$

where each $R^2$ is independently the blocking group X, each $R^3$ is independently the cross-linkable group, subscript b' represents the amount of the blocking group X present in the siloxane moiety Y, subscript b" represents the amount of the cross-linkable group present in the siloxane moiety Y, subscript b'" represents the number of [D] siloxy units present in the siloxane moiety Y (i.e., excluding those accounted for by the moieties indicated by subscripts b' and/or b"), and each other variable is as defined and described above. In these embodiments, as will be understood by those of skill in the art, subscripts b', b", and b'" are selected such that $0<b'<1$, $0<b''<1$, $0 \le b'''<1$, and b'+b"+b'"=b. However, the particular value of each of subscripts b', b", and b'" may vary, and will be independently selected in view of the description herein. It will be appreciated that the moieties indicated by subscripts a, b', b", b'", and c may be arranged in any order, such that the siloxane moiety Y may comprise these moieties in randomized or block form In some embodiments, the hindered organosilicon compound (A) comprises an organic moiety. For clarity and ease of reference, the organic moiety of the hindered organosilicon compound (A) is given the designation "Z" herein, and thus may be referred to as the "organic moiety Z" below. Typically, the hindered organosilicon compound (A) comprises the organic moiety Z in addition to the siloxane moiety Y. As such, in some embodiments, at least one $R^1$ of the siloxane moiety Y is a divalent hydrocarbon group bonded to the organic moiety Z. One of skill in the art will readily understand that the divalent hydrocarbon group may be any of the hydrocarbyl groups described above, or a derivative thereof (e.g. substituted with a bond to the organic moiety Z).

The organic moiety Z is not particularly limited, and may comprise, alternatively may be, any organic moiety suitable for use in and/or with the compounds, compositions, and methods described herein. In general, the organic moiety Z comprises a monovalent organic group (e.g. such as any of those described herein with regard to hydrocarbyl groups $R^1$, etc.), a divalent organic group (e.g. such as any of those described herein with regard to linking groups D, etc.), an organic polymer moiety, as described below, or combinations thereof.

In certain embodiments, the organic moiety Z comprises, alternatively is, an organic polymer moiety, i.e., an organic polymer or combination of organic polymers grafted onto or otherwise bonded to the siloxane moiety Y of the hindered organosilicon compound (A). Examples of such organic polymers include polyethers, polyacrylates, polyesters, polycarbonates and the like, as well as derivatives, modifications, and combinations thereof. However, as will be understood in view of the description herein, the organic moiety Z, and thus the hindered organosilicon compound (A), may comprise any organic polymer moiety comprising any organic polymer, or even merely at least one organic polymer group.

Specific examples of organic polymer groups include polyether groups, polyacrylate groups, polyester groups, polycarbonate groups, alkylaluminoxane groups, alkylgermoxane groups, polythioester groups, polythioether groups, polyacrylonitrile groups, polyacrylamide groups, epoxy groups, polyurethane groups, polyurea groups, polyacetal groups, polyolefin groups, polyvinyl alcohol groups, polyvinyl ester groups, polyvinyl ether groups, polyvinyl ketone groups, polyisobutylene groups, polychloroprene groups, polyisoprene groups, polybutadiene groups, polyvinylidene groups, polyfluorocarbon groups, polychlorinated hydrocarbon groups, polyalkyne groups, polyamide groups, polyimide groups, polyimidazole groups, polyoxazole groups, polyoxazine groups, polyoxidiazole groups, polythiazole groups, polysulfone groups, polysulfide groups, polyketone groups, polyetherketone groups, polyanhydride groups, polyamine groups, polyimine groups, polyphosphazene groups, polysaccharide groups, polypeptide groups, polyisocyante groups, polylactone groups, cellulosic groups, and the like, as well as derivatives, modifications, and combinations thereof.

In certain embodiments, the organic moiety Z comprises a combination of organic polymers, i.e., comprises, alternatively is, a copolymer of at least two different polymer groups. In such embodiments, each of the polymer groups may be independently selected, and may include any of the polymers or polymer groups described herein.

The hindered organosilicon compound (A) may comprise any number of the siloxane moiety Y and the organic moiety Z, with each moiety being independently selected and as described herein. For example, in certain embodiments, the hindered organosilicon compound (A) has the formula $[Y]_x[Z]_y$. In such embodiments, each siloxane moiety Y is independently selected in each moiety indicated by subscript x, each organic moiety Z is independently selected in each moiety indicated by subscript y, and the moieties indicated by subscripts x and y may be in randomized or block form in the hindered organosilicon compound (A).

In the formula above, subscripts x and y represent mole fractions of the siloxane moiety Y and the organic moiety Z in the hindered organosilicon compound (A), respectively.

As such, as will be understood by those of skill in the art, x+y=1. Subscripts x and y are typically selected such that $0<x\le 1$ and $0\le y<1$, but are otherwise not particularly limited. More specifically, subscript x is typically a value of from greater than 0 to 1 (i.e., $0<x\le 1$), such as from 0.3 to 1 (i.e., $0.3\le x\le 1$), such as from 0.3 to 1, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript y is typically a value of from 0 to less than 1 (i.e., $0\le x<1$), such as from 0 to 0.1 (i.e., $0\le x\le 0.1$), such as from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. However, values outside these ranges may also be selected. For example, in some embodiments, each of subscripts x and y is 0.5, such that the hindered organosilicon compound (A) comprises an equal proportion of siloxane moiety Y to organic moiety Z. In other embodiments, the hindered organosilicon compound (A) comprises a greater mole fraction of organic moiety Z to siloxane moiety Y, i.e., such that subscript $0.5<y<1$.

In general, the crosslinking compound (B) comprises at least two functional groups that are reactive with the crosslinkable group $R^3$ of the hindered organosilicon compound (A), and is otherwise not particularly limited. Typically, the crosslinking compound (B) has the general formula $R^6$-L-$R^6$, where L is a linking group and each $R^6$ is an independently selected functional group reactive with the crosslinkable group $R^3$ of the hindered organosilicon compound (A)

The linking group L is not limited, and may comprise siloxane segments and/or organic segments. However, it will be appreciated that any number of siloxane segments and/or organic segments may be utilized in or as the linking group L, in any order or combinations of orders. As such, linking group L, and thus the crosslinking compound (B), may be a homopolymer or a copolymer (e.g. block copolymer, random copolymer, alternate copolymer, etc.).

In certain embodiments, the linking group L comprises, alternatively is, a siloxane segment. Examples of siloxane segments include those described above with respect to divalent linking group D. In certain embodiments, the linking group L comprises, alternatively is, a siloxane segment having the general formula $[R^1{}_2SiO_{2/2}]_e$, where each $R^1$ is as defined above and subscript e represents the number of individual siloxane or siloxy units (i.e., [D] units) in the siloxane segment. In general, each subscript e is at least 1, alternatively is greater than 1. Typically, subscript e is from 1 to 10,000, such as from 2 to 5000, alternatively from 2 to 2000, alternatively from 5 to 1000, alternatively from 10 to 750, alternatively from 20 to 500. For example, in certain embodiments, subscript e is from 1 to 400, alternatively from 1 to 300, alternatively from 1 to 200, alternatively of from 1 to 100, alternatively of from 1 to 50, alternatively of from 1 to 25, alternatively of from 1 to 10, alternatively of from 2 to 10. In particular embodiments, subscript e is from 20 to 10,000, alternatively from 20 to 5,000, alternatively from 20 to 2,500, alternatively from 20 to 1000, alternatively from 50 to 1000, alternatively from 100 to 1000, alternatively from 200 to 1000, alternatively from 400 to 1000, alternatively from 500 to 1000, alternatively from 600 to 1000, alternatively of from 700 to 1000, alternatively of from 800 to 1000, alternatively of from 900 to 1000.

The linking group L may comprise but one siloxane segment (e.g. when the linking group L is itself a siloxane polymer, such as a polyorganosiloxane), or more than one siloxane segment (e.g. when the linking group L is a silicon-organic copolymer). As such, each siloxane segment of the linking group L has an independent DP, which may be individually selected. In certain embodiments, each siloxane segment of L has a DP of from 2 to 2000, such as from 5 to 1000, alternatively from 10 to 750, alternatively from 20 to 500. In particular embodiments, the linking group L is itself a siloxane polymer comprising a single siloxane segment having a DP of from 1 to 10,000, alternatively of from 5 to 1000. It is to be appreciated, however, that DP values outside of these ranges may also be utilized. Moreover, as each siloxane segment of L is independently selected, the DP of each siloxane segment need not be the same as each other, but rather may instead be the same as or different from the DP of any other siloxane segment of L of the crosslinking compound (B). For example, in certain embodiments, the crosslinking compound (B) has an overall DP of from 1 to 5000, such as from 2 to 2000. In these or other embodiments, the crosslinking compound (B) has an overall DP greater than 100, alternatively greater than 200, alternatively greater than 500, alternatively greater than 1000, alternatively greater than 2000, alternatively greater than 3000, alternatively greater than 4000, alternatively greater than 5000. In some embodiments, the crosslinking compound (B) has an overall DP less than 1000, alternatively less than 750, alternatively less than 500, alternatively less than 250. In specific embodiments, the crosslinking compound (B) has an overall DP of from 10 to 1000, such as from 10 to 800, alternatively from 20 to 600, alternatively from 20 to 400, alternatively from 20 to 200, alternatively of from 20 to 100.

In certain embodiments, the linking group L comprises an organic segment. Suitable organic segments may comprise, alternatively may be, any of the organic moieties described herein, such as those described above with respect to the organic moiety Z, the divalent linking group D, etc.

For example, in certain embodiments, the organic segment comprises, alternatively is, an organic polymer segment, i.e., an organic polymer or combination of organic polymers bonded to reactive functional groups $R^6$ and/or grafted onto a silicone segment of the crosslinking compound (B). Specific examples of suitable organic polymer segments include alkylaluminoxane segments, alkylgermoxane segments, polythioester segments, polyether segments, polythioether segments, polyacrylate segments, polyacrylonitrile segments, polyacrylamide segments, polyester segments, an epoxy segments, polyurethane segments, polyurea segments, polyacetal segments, polyolefin segments, polyvinyl alcohol segments, polyvinyl ester segments, polyvinyl ether segments, polyvinyl ketone segments, polyisobutylene segments, polychloroprene segments, polyisoprene segments, polybutadiene segments, polyvinylidene segments, polyfluorocarbon segments, polychlorinated hydrocarbon segments, polyalkyne segments, polyamide segments, polyimide segments, polyimidazole segments, polyoxazole segments, polyoxazine segments, polyoxidiazole segments, polythiazole segments, polysulfone segments, polysulfide segments, polyketone segments, polyetherketone segments, polyanhydride segments, polyamine segments, polyimine segments, polyphosphazene segments, polysaccharide segments, polypeptide segments, polyisocyanate segments, cellulosic segments, and the like, as well as modifications, derivatives, and combinations thereof. Each organic segment may independently comprise at least one, alternatively, at least two organic polymer segments.

When there are a plurality of polymer segments in the organic segment of the crosslinking compound (B), each polymer segment may be independently selected. In some embodiments, the linking group L comprises, alternatively is, a divalent hydrocarbon group, such as an alkylene group having from 1 to 30, alternatively from 1 to 20, alternatively from 2 to 20, alternatively from 2 to 10 methylene groups, which may be substituted or unsubstituted.

In general, the reactive functional groups $R^6$ are selected based on the cross-linkable group $R^3$ of the siloxane moiety Y, such that the crosslinking compound (B) is reactive with the hindered organosilicon compound (A) in a crosslinking reaction involving cross-linkable group $R^3$ and reactive functional groups $R^6$. It is to be appreciated that each $R^6$ is independently selected, such that reactive functional groups $R^6$ may be the same as or different from each other (e.g. in terms of reactivity, structure, etc.).

For example, each of the reactive functional groups $R^6$ may comprise, alternatively may be, a group reactive via a substitution reaction, an addition reaction, a radical reaction, a coupling reaction, or combinations thereof. Specific examples of such reactions include nucleophilic substitutions, ring-opening additions, alkoxylations and/or transalkoxylations, hydrosilylations, olefin metatheses, condensations, radical couplings and/or polymerizations, and the like, as well as combinations thereof. As such, each of the reactive functional groups $R^6$ may comprise, alternatively may be, a functional group that is hydrosilylatable (e.g. a silicon-bonded hydrogen atom, an alkenyl group, an alkynyl group, etc.), condensable (e.g. a hydroxyl group, a carboxyl group, an alkoxysilyl group, a silanol group, an amide group, etc.), displaceable (e.g. a "leaving group" as understood in the art, such as a halogen atom, or other group stable in an ionic form once displaced, or a functional group comprising such a leaving group, such as esters, anhydrides, amides, epoxides, etc.), nucleophilic (e.g. a heteroatom with lone pairs, an anionic or anionizable group, etc., such as a hydroxyl group, an amine group, a thiol group, a silanol group, a carboxylic acid group, group, etc.), electrophilic (e.g. isocyanates, epoxides, etc.), or various combinations thereof.

In certain embodiments, at least one of the reactive functional groups $R^6$ is independently selected from hydrosilylatable groups, and thus comprises, alternative is, an ethylenically unsaturated group or a silicon-bonded hydrogen atom. In some such embodiments, one or both of the reactive functional groups $R^6$ comprises, alternatively is, a silicon-bonded hydrogen atom, such that the crosslinking compound (B) is silicon hydride-functional. In other of such embodiments, each reactive functional group $R^6$ comprises, alternatively is, an ethylenically unsaturated group, such as any of those described above with respect to the cross-linkable group $R^3$ of the siloxane moiety Y of the hindered organosilicon compound (A).

In certain embodiments, at least one of the reactive functional groups $R^6$ comprises, alternatively is, a condensable group. Examples of condensable groups generally include any functional group capable of undergoing a condensation reaction (e.g. such as those involving a coupling reaction yielding water, an alcohol, or other small molecule as a byproduct), as will be understood by those of skill in the art. Examples of such condensable groups include hydroxyl groups, carboxyl groups, alkoxyl groups, amide groups, ester groups, anhydride groups, siloxy groups, silanol groups, and the like, and combinations thereof. Some examples of condensable groups include functional groups that may be transformed (e.g. in situ) into a functional group capable of undergoing or otherwise reacting in a condensation reaction, such as halosilanes, alkyl halides, esters, amides, etc., which may be hydrolyzed prior to participating in a condensation reaction.

It is to be understood that the reactive functional groups $R^6$ may be selected from any of the cross-linkable groups of $R^3$ described herein. For example, in certain embodiments, the reactive functional groups $R^6$ are selected from ethylenically unsaturated groups and mercapto groups, amine groups and epoxide groups, azide groups and alkyne groups, alkyne groups and nitrone groups, etc. Likewise, the reactive functional groups $R^6$ may comprise, alternatively may be, a hydroxyl group, an anhydride group, a carboxyl group, an ester, etc.

As introduced above, the composition optionally includes the catalyst (C). The inclusion of the catalyst (C) in the composition, and the particular type or specific compound(s) selected for use in or as the catalyst (C), will be readily selected by those of skill in the art based on the particular hindered organosilicon compound (A) and crosslinking compound (B) selected. More specifically, the catalyst (C) is selected to catalyze the crosslinking of the hindered organosilicon compound (A) with the crosslinking compound (B), and thus will be selected based on the particular cross-linkable group $R^3$ and reactive functional groups $R^6$ utilized, the type of crosslinking reaction desired, the particular crosslinking reaction conditions to be employed, etc. As such, the catalyst (C) is not particularly limited, and may comprise or be any compound suitable for facilitating the crosslinking the hindered organosilicon compound (A) with the crosslinking compound (B) (e.g. via reaction of/including cross-linkable group $R^3$ and reactive functional groups $R^6$), as will be understood by one of skill in the art in view of the description herein. For example, in certain embodiments, the catalyst (C) is selected from those facilitating reactions including hydrosilylation, condensation, displacement, acid-base, ring-opening, nucleophilic substitution, radical coupling, cycloaddition, and the like, as well as combinations of such reactions.

In certain embodiments, the catalyst (C) is a metal-based catalyst (i.e., comprises a metal, such as a transition metal), such as those comprising Pt, Ir, Ru, Pd, Fe, Sn, Ti, Al, Zr, Hf, Cu, etc. The particular catalyst is not limited, and will be selected by those of skill in the art to catalyze a particular type of reaction to crosslink the hindered organosilicon compound (A) with the crosslinking compound (B). For example, in certain embodiments, the catalyst (C) may comprise, alternatively consist essentially of, alternatively consist of hexachloroplatinic acid, which may be utilized to crosslink compounds (A) and (B) via a hydrosilylation reaction. In these or other embodiments, the catalyst (C) may comprise, alternatively consist essentially of, alternatively consist of dibutyltin dilaurate, which may be utilized to crosslink compounds (A) and (B) via a silanol condensation reaction. In these or other embodiments, the catalyst (C) may comprise, alternatively consist essentially of, alternatively consist of a low-valent Ti-based catalyst, which may be utilized to crosslink compounds (A) and (B) via a McMurry-type coupling reaction. In certain embodiments, the catalyst (C) may comprise, alternatively consist essentially of, alternatively consist of a Cu-based catalyst, which may be utilized to crosslink compounds (A) and (B) via a copper-catalyzed azide-alkyne cycloaddition (CuAAC) reaction.

In some embodiments, the catalyst (C) comprises, alternatively is, an inorganic or organic base or acid (i.e., an acid-type or base-type catalyst). In such embodiments, the catalyst (C) may comprise metal atoms, alternatively may be substantially free from, alternatively may be free from metal atoms. As understood by those of skill in the art, acid/base-type catalyst may be utilized to crosslink the hindered organosilicon compound (A) with the crosslinking compound (B) via condensation reactions, acid-base reactions, ring opening reaction, nucleophilic substitution reactions, etc. Examples of acid/base-type catalysts suitable for use in or as the catalyst (C) include lithium hydroxide (LiOH), sodium hydroxide (NaOH), potassium hydroxide (KOH), cesium hydroxide (CsOH), tetramethylammonium hydroxide (($CH_3$)$_4$NOH), 1,8-diazabicyclo [5.4.0]undec-7-ene (DBU), sulfonic acids, sulfuric acid ($H_2SO_4$), carboxylic acids, mineral acids, and the like, as well as derivatives, modifications, and combinations thereof.

In certain embodiments, the catalyst (C) comprises, alternatively is, a compound that generates a free radical, an acid, or a base, e.g. when exited by a certain type of energy source (e.g. heat, UV light, etc.), via a chemical reaction, etc. Examples of such compounds include (2,2,6,6-Tetramethylpiperidin-1-yl)oxyl (TEMPO), triazines, thiazines such as 10-phenylphenothiazine, 9,9'-bixanthene-9,9'-diol, 2,2-dimethoxy-2-phenylacetophenone, peroxides such as 2,5-dimethyl-2,5-di-(tert-butylperoxy)hexane (DBPH), and the like, as well as derivatives, modifications, and combinations thereof. In certain embodiments, the catalyst (C) may comprise, alternatively consist essentially of, alternatively consist of a fac-tris(2-phenylpyridine)-based catalyst, which may be utilized to crosslink compounds (A) and (B) via a reaction comprising light-mediated radical generation.

In specific embodiments, the catalyst (C) comprises, alternatively is, a hydrosilylation catalyst. The hydrosilylation catalyst is not limited and may be any known hydrosilylation catalyst for catalyzing hydrosilylation reactions. Combinations of different hydrosilylation catalysts may be utilized. In certain embodiments, the hydrosilylation catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation catalyst.

Additional examples of catalysts suitable for the hydrosilylation catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation catalyst.

The hydrosilylation catalyst may be in any suitable form. For example, the hydrosilylation catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation catalyst may be in or on a solid carrier. Examples of carriers include activated carbons, silicas, silica aluminas, aluminas, zeolites and other inorganic powders/particles (e.g. sodium sulphate), and the like. The hydrosilylation catalyst may also be disposed in a vehicle, e.g. a solvent which solubilizes the hydrosilylation catalyst, alternatively a vehicle which merely carries, but does not solubilize, the hydrosilylation catalyst. Such vehicles are known in the art.

In specific embodiments, the hydrosilylation catalyst comprises platinum. In these embodiments, the hydrosilylation catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds.

Complexes of platinum with organopolysiloxanes suitable for use as the hydrosilylation catalyst include 1,3-diethenyl-1,1,3,3-tetramethyldisiloxane complexes with platinum. These complexes may be microencapsulated in a resin matrix. Alternatively, the hydrosilylation catalyst may comprise 1,3-diethenyl-1,1,3,3-tetramethyldisiloxane complex with platinum. The hydrosilylation catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole $(COD)PtCl_2$ with 0.045 mole COD and 0.0612 moles $HMeSiCl_2$, where COD represents cyclooctadiene.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

In particular embodiments, the catalyst (C) comprises a phase transfer catalyst. Examples of phase transfer catalysts include tetraalkyl ammonium and/or phosphonium salts, such as tetrabutyl ammonium bromide, tetrabutyl phosphonium bromide, and the like, as well as combinations thereof.

It is to be appreciated that the catalyst (C) may itself comprise more than one type of catalyst and/or the reaction may utilize more than one type of catalyst (C), such as two, three, or more different catalysts (C).

In the composition, the hindered organosilicon compound (A) the crosslinking compound (B), and the catalyst (C), when utilized, may be used alone or together (e.g. neat or in combination with a carrier vehicle), and may be supplemented by at least one auxiliary component, or may act as an auxiliary to at least one other component, optionally in the presence of one of more additives (e.g. agents, adjuvants, ingredients, modifiers, etc.).

In certain embodiments, the composition further comprises one or more additional components, such as one or more additives. It is to be appreciated that such additives may be classified under different terms of art and just because an additive is classified under such a term does not mean that it is thusly limited to that function. Moreover, some of these additives may be present in a particular component of the composition, or instead may be incorporated when forming the composition. Typically, the composition may comprise any number of additives, e.g. depending on the particular type and/or function of the same in the composition. For example, in certain embodiments, the composition may comprise one or more additives comprising, alternatively consisting essentially of, alternatively consisting of: a carrier (e.g. a carrier vehicle, such as a solvent, diluent, etc.); a filler; a filler treating agent; a surface modifier; a surfactant; a rheology modifier; a viscosity modifier; a binder; a thickener; a tackifying agent; an adhesion promotor; a defoamer; a compatibilizer; an extender; a plasticizer; an end-blocker; a reaction inhibitor; a drying agent; a water release agent; a colorant (e.g. a pigment, dye, etc.); an anti-aging additive; a biocide; a flame retardant; a corrosion inhibitor; a catalyst inhibitor; a UV absorber; an anti-oxidant; a light-stabilizer; a catalyst (e.g. other than the catalyst (C)), procatalyst, or catalyst generator; an initiator (e.g. a heat activated initiator, an electromagnetically activated initiator, etc.); a photoacid generator; an acid acceptor; a heat stabilizer; and the like, as well as derivatives, modifications, and combinations thereof.

In certain embodiments, the composition comprises a filler, such as electrically and/or thermally conductive or non-conductive fillers, mineral filler, etc. Examples of electrically conductive fillers include those comprising a metal or a conductive non-metal, or metal or non-metal particles having an outer surface of a metal (e.g. a noble metal such as silver, gold, platinum, palladium, and alloys thereof, or a base metal such as nickel, aluminum, copper, or steel), including those also comprising a core of particles consisting of copper, solid glass, hollow glass, mica, nickel, ceramic fiber, or polymerics such as polystyrene, polymethylmethacrylate, etc. Example of thermally conductive fillers include those comprising aluminum, copper, gold, nickel, silver, alumina, magnesium oxide, beryllium oxide, chromium oxide, titanium oxide, zinc oxide, barium titanate, diamond, graphite, carbon or silicon nano-sized particles, boron nitride, aluminum nitride, boron carbide, titanium carbide, silicon carbide, and tungsten carbide. Examples of mineral fillers include titanium dioxide, aluminium trihydroxide (also called ATH), magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, ceramic or glass beads, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulphide, wollastonite, and the like, as well as derivatives, modifications, and combinations thereof.

In certain embodiments, the composition comprises one or more reinforcing fillers, non-reinforcing fillers, or a mixture thereof. Examples of reinforcing fillers include of finely divided fillers such as high surface area fumed and precipitated silicas, including rice hull ash and, to a degree, calcium carbonate. Examples of non-reinforcing fillers include finely divided fillers such as crushed quartz, diatomaceous earths, barium sulphate, iron oxide, titanium dioxide, carbon black, talc, and wollastonite. Other fillers which might be used alone or in addition to those above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Additional fillers suitable for use in the composition include aluminum oxide, silicates from the group consisting of olivine group; garnet group; aluminosilicates; ring silicates; chain silicates; and sheet silicates. In certain embodiments, some fillers can be utilized to tune a thixotropic property of the composition.

In various embodiments, the composition further comprises an adhesion-imparting agent (e.g. an adhesion promotor). The adhesion-imparting agent can improve adhesion of the networked silicone formed from the composition, e.g. to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl) ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom. The organosilicon compound of the adhesion-imparting agent generally comprises a silicon-bonded alkenyl group or silicon-bonded hydrogen atom. Moreover, due to the ability to impart good adhesion with respect to various types of base materials, the organosilicon compound of the adhesion-imparting agent generally comprises at least one epoxy group-containing monovalent organic group in a molecule. These type of organosilicon compounds are exemplified by organosilane compounds, organosiloxane oligomers and alkyl silicates, as understood by those of skill in the art. Molecular structures of the organosiloxane oligomers and/or alkyl silicate are exemplified by a linear chain structure, partially branched linear chain structure, branched chain structure, ring-shaped structure, and net-shaped structure, where the linear chain structure, branched chain structure, and net-shaped structure are typical. Specific organosilicon compounds for use in or as the adhesion-imparting agent are exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxy group and at least one silicon-bonded alkenyl group in the molecule; and methyl polysilicate, ethyl polysilicate, and epoxy group-containing ethyl polysilicate.

The one or more of the additives can be present as any suitable weight percent (wt. %) of the composition (e.g. based on the total weight of all components therein), such as from 0.01 to 90, alternatively from 0.01 to 75, alternatively from 0.01 to 65, alternatively from 0.05 to 35, alternatively from 0.1 to 15, alternatively from 0.5 to 5 wt. %. In some instances, one or more of the additives can be present in the composition in an amount less than 1 wt. %, such as 0.01, alternatively 0.05, alternatively 0.1, alternatively 0.5, alternatively 0.9 wt. %, and values therebetween. In certain instances, one or more of the additives can be present in the composition in an amount of greater than 1 wt. %, such as in an amount of 1, 2, 3, 4, 5, 6, 7, 8, 9, 10, 11, 12, 13, 14, or 15 wt. %, or more, of the composition. One of skill in the art can readily determine a suitable amount of a particular additive depending, for example, on the type of additive and the desired outcome.

In specific embodiments, the composition comprises a carrier vehicle. The carrier vehicle is not limited as is typically selected for based on the particular hindered organosilicon compound (A), crosslinking compound (B), and catalyst (C) selected, such as in view of a desired crosslinking reaction thereof. For example, the some embodiments, the carrier vehicle comprises, alternatively may be, an oil (e.g. an organic oil and/or a silicone oil), a fluid, a solvent, etc., or a combination thereof.

In some embodiments, the carrier vehicle comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s, include DOWSIL® 200 Fluids and DOWSIL® OS FLUIDS, which are commercially available from Dow Silicones Corporation of Midland, Mich., U.S.A.

In certain embodiments, the carrier vehicle comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the carrier vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidinone; and the like, as well as derivatives, modifications, and combination thereof.

Other carrier vehicles may also be utilized in the composition. For example, in some embodiments, the carrier vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl) imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis (trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl) imide, lithium bis(trifluoromethanesulfonyl)imide, and the like, as well as derivatives, modifications, and combinations thereof.

In certain embodiments, the carrier vehicle comprises, alternative is, water. The water is not particularly limited. For example, purified water such as distilled water and ion exchanged water, saline, a phosphoric acid buffer aqueous solution, and the like, or combinations and/or modifications thereof, can be used.

The carrier vehicle may comprise a combination of different vehicles, which may be miscible or immiscible with one another. For example, the composition itself may be homogenous or heterogeneous. The composition may also be in the form of an emulsion, such as a water-in-oil emulsion, silicone-in-oil emulsion, oil-in-water emulsion, oil-in-silicone emulsion, etc.

A method of preparing the networked silicone (the "preparation method") is also provided. The preparation method comprises reacting the hindered organosilicon compound (A) and the crosslinking compound (B), optionally in the presence of the catalyst (C), to give the networked silicone. Accordingly, as will be appreciated by those of skill in the art in view of the description herein, the preparation method may be carried out or otherwise performed with the composition described above.

In general, reacting the hindered organosilicon compound (A) and the crosslinking compound (B) comprises combining the hindered organosilicon compound (A) and the crosslinking compound (B), optionally in the presence of the catalyst (C). Said differently, there is generally no proactive step required for the reaction beyond combining the hindered organosilicon compound (A) and the crosslinking compound (B), and optionally the catalyst (C). As will be appreciated by those of skill in the art, the reaction of the hindered organosilicon compound (A) and the crosslinking compound (B) may be generally defined or otherwise characterized depending on the particular nature of the crosslinking reaction (i.e., based on the particular cross-linkable groups $R^3$ and reactive functional groups $R^6$ selected). As such, the particular conditions of the reaction may be selected by those of skill in the art based on the crosslinking reaction in particular.

The hindered organosilicon compound (A) utilized in the preparation method is as described above with respect to the composition. As such, the description of the hindered organosilicon compound (A) above, e.g. the description relating to the general formula (I), equally applies to the hindered organosilicon compound (A) utilized in the preparation method.

The hindered organosilicon compound (A) may be utilized in any amount, which will be selected by one of skill in the art, e.g. dependent upon the particular components selected for reacting, the reaction parameters employed, the scale of the reaction (e.g. total amounts of component (A) to be reacted and/or networked silicone to be prepared), etc.

The hindered organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise, alternatively may be, any of those described above. For example, the carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform, etc.; ethers such as diethyl ether, tetrahydrofuran, etc.; etc.), a silicone fluid, or combinations thereof. When utilized, the carrier vehicle will be selected based on the particular components of the reaction, such as the particular hindered organosilicon compound (A), crosslinking compound (B), and catalyst (C) selected, such as in view of a desired crosslinking reaction thereof. More specifically, in some embodiments, the carrier vehicle is selected based on the nature and type of cross-linkable group $R^3$ and reactive functional groups $R^6$ and/or the type of crosslinking reaction of the same. For example, in certain embodiments, the method is carried out in the presence of a carrier vehicle or solvent comprising a polar component, such as an ether, acetonitrile, dimethylformamide, dimethylsulfoxide, and the like, or combinations thereof. In some embodiments, the carrier vehicle may comprise a halogenated hydrocarbon, such as those described above.

It will be appreciated that the hindered organosilicon compound (A) may be combined with the carrier vehicle, if utilized, prior to, during, or after being combined with any one or more other components of the reaction. In certain embodiments, the hindered organosilicon compound (A) may be utilized as a carrier vehicle for the reaction, e.g. when the hindered organosilicon compound (A) itself is fluid/liquid under the reaction conditions employed.

In certain embodiments, the hindered organosilicon compound (A) is free from, alternatively substantially free from carrier vehicles. In some such embodiments, the hindered organosilicon compound (A) is free from, alternatively substantially free from, water and carrier vehicles/volatiles reactive with the hindered organosilicon compound (A) and/or any one or more other components of the reaction. In some embodiments, the method is carried out in the absence of carrier vehicles/volatiles that are reactive with the hindered organosilicon compound (A) and/or any one or more other components of the reaction. For example, in certain embodiments, the method may comprise stripping a mixture of the hindered organosilicon compound (A) of volatiles and/or solvents prior to combining the same with any one or more other components of the reaction. Techniques for stripping the hindered organosilicon compound (A) are known in the art, and may include heating, drying, applying reduced pressure/vacuum, azeotroping with solvents, utilizing molecular sieves, etc., and combinations thereof.

The hindered organosilicon compound (A) may be prepared as part of the preparation method, or otherwise obtained (i.e., as a prepared compound). In certain embodiments, the preparation method includes preparing the hindered organosilicon compound (A) prior to reacting the same with the crosslinking compound (B).

In some embodiments, preparing the hindered organosilicon compound (A) comprises reacting (A1) an initial organosilicon compound and (A2) a blocking compound, optionally in the presence of (C2) a catalyst, to give the hindered organosilicon compound (A).

In general, the initial organosilicon compound (A1) is an organosilicon compound comprising an organosiloxane-containing backbone having at least two cross-linkable groups. More specifically, the initial organosilicon compound (A1) comprises a siloxane moiety $Y^1$ having the general formula (III):

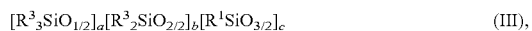

$$[R^3{}_3SiO_{1/2}]_a[R^3{}_2SiO_{2/2}]_b[R^1SiO_{3/2}]_c \qquad (III),$$

where $R^1$, $R^3$, and subscripts a, b, and c are each as defined above, with the proviso that at least two $R^3$ of the siloxane moiety $Y^1$ are the cross-linkable group.

As will be appreciated by those of skill in the art in view of the description herein, the siloxane moiety $Y^1$ of the initial organosilicon compound (A1) forms the backbone of the siloxane moiety Y of the hindered organosilicon compound (A) (i.e., absent only blocking group X of $R^2$). In particular, some of the moieties indicated by subscript b in general formula (III), specifically those containing the cross-linkable group $R^3$ become linked to the blocking group X of the hindered organosilicon compound (A), e.g. via linkage formed by reaction of the cross-linkable group $R^3$ and the blocking compound (A2) described below.

In certain embodiments, the initial organosilicon compound (A1) has the formula $[Y^1]_x[Z]_y$, where each siloxane moiety $Y^1$ is independently selected in each moiety indicated by subscript x, and Z, subscript x, and subscript y are independently selected and as defined above.

In general, the blocking compound (A2) is an organosiloxane polymer, an organosiloxane-organic copolymer, an organic polymer, or an organic or organosilicon compound comprising a functional group that is reactive with the cross-linkable group $R^3$ of the initial organosilicon compound (A1). More specifically, the blocking compound (A2) typically has the general formula X—$R^7$, where $R^7$ is a functional group reactive with at least one of the cross-linkable group $R^3$ of the initial organosilicon compound (A1), and X is the blocking group described above. As will be appreciated by those of skill in the art in view of the description herein, the blocking compound (A2) forms the blocking group X of the hindered organosilicon compound (A) (i.e., blocking group X of $R^2$ of the siloxane moiety Y).

In general, the reactive functional group $R^7$ is selected based on the cross-linkable group $R^3$ of the siloxane moiety $Y^1$, such that the blocking compound (A2) is reactive with the initial organosilicon compound (A1) in a coupling reaction involving cross-linkable group $R^3$ and reactive functional group $R^7$.

For example, reactive functional group $R^7$ may comprise, alternatively may be, a group reactive via a substitution reaction, an addition reaction, a radical reaction, a coupling reaction, or combinations thereof. Specific examples of such reactions include nucleophilic substitutions, ring-opening additions, alkoxylations and/or transalkoxylations, hydrosilylations, olefin metatheses, condensations, radical couplings and/or polymerizations, and the like, as well as combinations thereof. As such, the reactive functional group $R^7$ may comprise, alternatively may be, a functional group that is hydrosilylatable (e.g. a silicon-bonded hydrogen atom, an alkenyl group, an alkynyl group, etc.), condensable (e.g. a hydroxyl group, a carboxyl group, an alkoxysilyl group, a silanol group, an amide group, etc.), displaceable (e.g. a "leaving group" as understood in the art, such as a halogen atom, or other group stable in an ionic form once displaced, or a functional group comprising such a leaving group, such as esters, anhydrides, amides, epoxides, etc.), nucleophilic (e.g. a heteroatom with lone pairs, an anionic or anionizable group, etc., such as a hydroxyl group, an amine group, a thiol group, a silanol group, a carboxylic acid group, group, etc.), electrophilic (e.g. isocyanates, epoxides, etc.), or various combinations thereof. Particular examples of functional groups suitable for $R^7$ include those described above with respect to the cross-linkable group $R^3$ of the siloxane moiety $Y^1$ of the initial organosilicon compound (A1), cross-linkable group $R^3$ of the siloxane moiety Y of the hindered organosilicon compound (A), and reactive functional groups $R^6$ of the crosslinking compound (B).

In certain embodiments, the reactive functional group $R^7$ is selected from hydrosilylatable groups, and thus comprises, alternative is, an ethylenically unsaturated group or a silicon-bonded hydrogen atom. In some such embodiments, the reactive functional group $R^7$ comprises, alternatively is, a silicon-bonded hydrogen atom, such that the blocking compound (A2) is silicon hydride-functional. In other of such embodiments, the reactive functional group $R^7$ comprises, alternatively is, an ethylenically unsaturated group. In particular embodiments, the reactive functional group $R^7$ comprises, alternatively is, a condensable group.

As introduced above, preparing the hindered organosilicon compound (A) may comprise reacting the initial organosilicon compound (A1) and the blocking compound (A2) in the presence of the catalyst (C2). The use of the catalyst (C2), as well as the particular type or specific compound(s) selected for use in or as the catalyst (C2), will be readily selected by those of skill in the art based on the particular initial organosilicon compound (A1) and blocking compound (A2) selected. More specifically, the catalyst (C2) is selected to catalyze formation of hindered moieties X of the hindered organosilicon compound (A) via reaction of both reactive functional groups $R^7$ of the blocking compound (A2) and cross-linkable groups $R^3$ of the initial organosilicon compound (A1).

The catalyst (C2) is not particularly limited, and may comprise or be any compound suitable for facilitating the reaction of the initial organosilicon compound (A1) and the blocking compound (A2) (e.g. via reaction of/including cross-linkable groups $R^3$ and reactive functional group $R^7$), as will be understood by one of skill in the art in view of the description herein. For example, in certain embodiments, the catalyst (C2) is selected from those facilitating reactions including hydrosilylation, condensation, displacement, acid-base, ring-opening, nucleophilic substitution, radical coupling, and the like, as well as combinations of such reactions. Accordingly, the catalyst (C2) may be selected from any of the catalysts described herein with respect to the catalyst (C).

Typically, components (A1) and (A2), and optionally (C2), are reacted in a vessel or reactor to prepare the hindered organosilicon compound (A). When the reaction is carried out at an elevated or reduced temperature as described below, the vessel or reactor may be heated or cooled in any suitable manner, e.g. via a jacket, mantle, exchanger, bath, coils, etc.

The components (A1) and (A2), and optionally (C2), may be reacted in any amounts and/or ratios, which will be selected by one of skill in the art, e.g. in view of the particular components selected, the particular coupling reacting being performed (e.g. between the cross-linkable group $R^3$ and the reactive functional group $R^7$), etc. Particular amounts, ratios, etc., may be selected based on the parameters of the crosslinking reaction between components (A) and (C) described below.

Components (A1) and (A2), and optionally (C2), may be fed together or separately to the vessel, or may be disposed in the vessel in any order of addition, and in any combination. For example, in certain embodiments, components (A2) and (C2) are added to a vessel containing component (A1). In such embodiments, components (A2) and (C2) may be first combined prior to the addition, or may be added to the vessel sequentially (e.g. (C2) then (A2)). In other embodiments, component (C2) is added to a vessel containing components (A1) and (A2), either as a premade catalyst or as individual components to form the catalyst (C2) in situ. In general, reference to the "reaction mixture" herein refers generally to a mixture comprising components (A1) and (A2), and optionally (C2) if utilized, (e.g. as obtained by combining such components, as described above).

The method may further comprise agitating the reaction mixture. The agitating may enhance mixing and contacting together components (A1), (A2), and optionally (C2), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., crosslinking), of the initial organosilicon compound (A1) with the blocking compound (A2) to form the hindered organosilicon compound (A). Other conditions may be result-effective conditions for enhancing reaction yield or minimizing amount of a particular reaction by-product included within the reaction product along with the hindered organosilicon compound (A).

In general embodiments, the reaction of components (A1) and (A2) is carried out in the presence of a carrier vehicle or solvent, such as one or more of those described above. For example, portions of carrier vehicle or solvent may be added to or otherwise combined with the initial organosilicon compound (A1), the blocking compound (A2), and/or the catalyst (C2) (when utilized) discretely, collectively with mixtures of components (A1), (A2) and/or (C2), or with the reaction mixture as a whole. The total amount of carrier vehicle/solvent present in the reaction mixture will be selected by one of skill in the art, e.g. based on the particular component (A1), (A2), and/or (C2) selected, the reaction parameters employed, etc.).

Typically, the carrier vehicle will be utilized in an amount sufficient to maximize intramolecular reactions of the blocking compound (A2) and the initial organosilicon compound (A1), while minimizing intermolecular reactions (e.g. cross-linking reactions) therebetween. For example, in certain embodiments, the carrier vehicle is utilized in an amount of from 5 to 99 wt. %, such as from 5 to 95, alternatively from 10 to 95, alternatively from 50 to 90 wt. %, based on the total weight of the reaction mixture (i.e., the combined weight of components (A1), (A2), (C2), the carrier vehicle, and any additional components/additives utilized).

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20° C. In some embodiments, the reaction is carried out at a temperature of about 0° C. (e.g. by use of an ice bath, or a circulator or chiller using ice and/or a set point of 0° C.). In some embodiments, the reaction is carried out at room temperature (i.e., from 20 to 25° C.).

In some embodiments, the reaction is carried out at the elevated temperature. The elevated temperature will be selected and controlled depending on the particular initial organosilicon compound (A1) selected, the particular blocking compound (A2) selected, the reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 300° C., such as from 30 to 280, alternatively from 40 to 260, alternatively from 40 to 250, alternatively from 50 to 250, alternatively from 50 to 240, alternatively from 60 to 240, alternatively from 60 to 230, alternatively from 70 to 225, alternatively from 70 to 210, alternatively from 70 to 200° C.

In certain embodiments, the reaction is carried out at reduced pressure. The reduced pressure will be selected and controlled depending on the particular blocking compound (A2) selected, the particular catalyst (C2) selected, etc. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization, degradation, and/or decomposition byproducts). Likewise, it is also to be appreciated that reaction parameters may be modified during the reaction of components (A1) and (A2). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time during which the reaction of components (A1) and (A2) to prepare the hindered organosilicon compound (A) is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 96, alternatively from 2 to 72, alternatively from 2 to 48, alternatively from 3 to 36, alternatively from 4 to 24, alternatively of 6, 12, 18, 24, 36, or 48 hours, as will be readily determined by one of skill in the art (e.g. by monitoring conversion of the initial organosilicon compound (A1), production of the hindered organosilicon compound (A), etc., such as via chromatographic and/or spectroscopic methods). In certain embodiments, the time during which the reaction is carried out is from greater than 0 to 48 hours, alternatively from 1 to 36 hours, alternatively from 1 to 24 hours, alternatively from 1 to 12 hours, alternatively from 2 to 12 hours, alternatively from 2 to 8 hours, after components (A1) and (A2) are combined, optionally in the presence of component (C2

Generally, the reaction of components (A1) and (A2) prepares a reaction product comprising the hindered organosilicon compound (A). In particular, over the course of the reaction, the reaction mixture comprising components (A1) and (A2) comprises increasing amounts of the hindered organosilicon compound (A) and decreasing amounts of components (A1) and (A2). Once the reaction is complete (e.g. one of components (A1) and (A2) is consumed, no additional hindered organosilicon compound (A) is being prepared, etc.), the reaction mixture may be referred to as a reaction product comprising the hindered organosilicon compound (A). In this fashion, the reaction product typically includes any remaining amounts of components (A1) and (A2), and optionally (C2), as well as degradation and/or reaction products thereof (e.g. byproducts and/or other materials which were not previously removed via any distillation, stripping, etc.). If the reaction is carried out in any carrier vehicle or solvent, the reaction product may also include such carrier vehicle or solvent. In certain such embodiments, the carrier vehicle or solvent can be removed by distillation or stripping, such that the reaction product is substantially free from, alternatively free from, the carrier vehicle or solvent.

The crosslinking compound (B) utilized in the preparation method is as described above with respect to the same compound of the composition. As such, the description of the crosslinking compound (B) above, e.g. that relating to general formula $R^6$-L-$R^6$, equally applies to the crosslinking compound (B) utilized in the preparation method.

The crosslinking compound (B) may be utilized in any amount, which will be selected by one of skill in the art, e.g. dependent upon the particular components selected for reacting, the reaction parameters employed, the scale of the reaction (e.g. total amounts of component (B) to be reacted and/or networked silicone to be prepared), etc.

The crosslinking compound (B) may be utilized in any form, such as neat (i.e., absent solvents, carrier vehicles, diluents, etc.), or disposed in a carrier vehicle, such as a solvent or dispersant. The carrier vehicle, if present, may comprise, alternatively may be, any of those described above. For example, the carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform, etc.; ethers such as diethyl ether, tetrahydrofuran, etc.; etc.), a silicone fluid, or combinations thereof. When utilized, the carrier vehicle will be selected based on the particular components of the reaction, such as the particular hindered organosilicon compound (A), crosslinking compound (B), and catalyst (C) selected, such as in view of a desired crosslinking reaction thereof. More specifically, in some embodiments, the carrier vehicle is selected based on the nature and type of cross-linkable group $R^3$, the reactive functional groups $R^6$, the type of crosslinking reaction to be performed, etc. For example, in certain embodiments, the method is carried out in the presence of a carrier vehicle or solvent comprising a polar component, such as an ether, acetonitrile, dimethylformamide, dimethylsulfoxide, and the like, or combinations thereof. In some embodiments, the carrier vehicle may comprise a halogenated hydrocarbon, such as those described above.

It will be appreciated that the crosslinking compound (B) may be combined with the carrier vehicle, if utilized, prior to, during, or after being combined with any one or more other components of the reaction. In certain embodiments, the crosslinking compound B) may be utilized as a carrier vehicle for the reaction, e.g. when the crosslinking compound (B) itself is fluid/liquid under the reaction conditions employed.

In certain embodiments, the crosslinking compound (B) is free from, alternatively substantially free from carrier vehicles. In some such embodiments, the crosslinking compound (B) is free from, alternatively substantially free from, water and carrier vehicles/volatiles reactive with the crosslinking compound (B) and/or any one or more other components of the reaction. In some embodiments, the method is carried out in the absence of carrier vehicles/volatiles that are reactive with the crosslinking compound (B) and/or any one or more other components of the reaction. For example, in certain embodiments, the method may comprise stripping a mixture of the crosslinking compound (B) of volatiles and/or solvents prior to combining the same with any one or more other components of the reaction. Techniques for stripping the crosslinking compound (B) are known in the art, and may include heating, drying, applying reduced pressure/vacuum, azeotroping with solvents, utilizing molecular sieves, etc., and combinations thereof.

The crosslinking compound (B) may be prepared as part of the preparation method, or otherwise obtained (i.e., as a prepared compound). Methods of preparing compounds suitable for use in, or as, the crosslinking compound (B) are known in the art, and some of such compounds are commercially available from various suppliers. Additionally, preparing the crosslinking compound (B), when part of the preparation method, may be performed prior to the reaction of components (A) and (B), or in situ (i.e., during the reaction of components (A) and (B), such that component (B) is consumed upon formation, e.g. via combining components of the crosslinking compound (B) with component (A) and, optionally, the catalyst (C)).

The catalyst (C) utilized in the preparation method is as described above with respect to the same component of the composition. As such, the description of the catalyst (C) above equally applies to the catalyst (C) utilized in the preparation method.

The catalyst (C) may be utilized in any form, such as neat (i.e., absent solvents, carrier vehicles, diluents, etc.), or disposed in a carrier vehicle, such as a solvent or dispersant (e.g. such as any of those listed above).

In some embodiments, the catalyst (C) is utilized in a form absent water and/or carrier vehicles/volatiles reactive with the hindered organosilicon compound (A), the crosslinking compound (B), and/or the catalyst (C) itself (i.e., at least until combined with components (A) and (B)). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected (e.g. the concentration/amount of active components thereof, the type of catalyst being utilized, the type of crosslinking reaction being performed, etc.), the reaction parameters employed, the scale of the reaction (e.g. total amounts of components (A) and (B), relative amount of cross-linkable group $R^3$ and reactive functional groups $R^6$, etc.), etc. The molar ratio of the catalyst (C) to components (A) and/or (B) utilized in the reaction may influence the rate and/or amount of crosslinking to prepare the networked silicone. Thus, the amount of the catalyst (C) as compared to components (A) and/or (B), as well as the molar ratios therebetween, may vary. Typically, these relative amounts and the molar ratio are selected to maximize the reaction of components (A) and (B) while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.000001 to 50 wt. %, based on the total amount of component (A) utilized (i.e., wt./wt.). For example, the catalyst (C) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (A) utilized. Likewise, or alternatively, the catalyst (C) may be utilized in the reaction in an amount of from 0.000001 to 50 wt. %, based on the total amount of component (B) utilized (i.e., wt./wt.). For example, the catalyst (B) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (B) utilized. It will be appreciated that ratios outside of these ranges may be utilized as well.

In some embodiments (e.g. when the type of crosslinking reaction dictates a stoichiometric loading), the amount of the catalyst (C) utilized may be selected and/or determined on a molar ratio based on one or more components of the reaction, as will be understood by those of skill in the art. In such embodiments, the catalyst (C) may be utilized in the reaction in an amount of from 0.001 to 50 mol %, based on the total amount of component (A) utilized. For example, the catalyst (C) may be used in an amount of from 0.005 to 40, alternatively of from 0.005 to 30, alternatively of from 0.005 to 20, alternatively of from 0.01 to 20 mol %, based on the total amount of component (A) utilized. Likewise, or alternatively, the catalyst (C) may be used in an amount of from 0.005 to 40, alternatively of from 0.005 to 30, alternatively of from 0.005 to 20, alternatively of from 0.01 to 20 mol %, based on the total amount of the crosslinking compound (B) utilized. However, it will also be appreciated that ratios outside of these ranges may be utilized.

Methods of preparing compounds suitable for use in, or as, the catalyst (C) are well known in the art, and many of the compounds listed herein are commercially available from various suppliers. As such, the catalyst (C) may be prepared as part of the method, or otherwise obtained (i.e., as a prepared compound). Additionally, preparing the catalyst (C) may be performed prior to the reaction of components (A) and (B), or in situ (i.e., during the reaction of components (A) and (B), e.g. via combining components of the catalyst (C) with components (A) and/or (B)).

The relative amounts of the hindered organosilicon compound (A) and the crosslinking compound (B) utilized may vary, e.g. based upon the particular hindered organosilicon compound (A) selected, the particular crosslinking compound (B) selected, the reaction parameters employed, e.g. whether the catalyst (C) is utilized, etc. Typically, an excess (e.g. molar and/or stoichiometric) of one of components (A) and (B) is utilized to fully crosslink the hindered organosilicon compound (A) and/or fully consume the crosslinking compound (B), e.g. to simplify purification of the reaction product formed therefrom. For example, in certain embodiments, the crosslinking compound (B) is utilized in relative excess of the hindered organosilicon compound (A)) to maximize crosslinking of the hindered organosilicon compound (A) to prepare the networked silicone therefrom. It will be appreciated that the hindered organosilicon compound (A) may instead be used in excess of the crosslinking compound (B) (e.g. when maximum consumption of the crosslinking compound (B) is desired.

As understood by those of skill in the art, the crosslinking of the hindered organosilicon compound (A) with the crosslinking compound (B) occurs at a theoretical maximum based on the number of cross-linkable groups $R^3$ present within the hindered organosilicon compound (A). In particular, with reference to each siloxane moiety Y of general formula (I) of the hindered organosilicon compound (A) above, each cross-linkable group designated by Si—$R^3$ can be reacted with one of the reactive functional groups $R^6$ of the crosslinking compound (B), of which there are two, such that one molar equivalent of the crosslinking compound (B) is needed for every two cross-linkable groups of the hindered organosilicon compound (A) (i.e., for every two molecules of the hindered organosilicon compound (A) including one cross-linkable group Si—$R^3$) to achieve a theoretically complete (i.e., maximum) crosslinking reaction. Likewise, the theoretical maximum stoichiometric ratio of the reaction of the hindered organosilicon compound (A) with the crosslinking compound (B) is 1:1 [$R^3$]:[$R^6$], where [$R^3$] represents the number of cross-linkable groups of the hindered organosilicon compound (A) and [$R^6$] represents the number of reactive functional groups $R^6$ of the crosslinking compound (B), which is generally fixed at 2. As such, the hindered organosilicon compound (A) and the crosslinking compound (B) are typically reacted in a stoichiometric ratio of from 10:1 to 1:10, alternatively from 8:1 to 1:8, alternatively from 6:1 to 1:6, alternatively from 4:1 to 1:4, alternatively from 2:1 to 1:2, alternatively 1:1 [$R^3$]:[$R^6$], where [$R^3$] and [$R^6$] are as defined above. In these or other embodiments, the hindered organosilicon compound (A) and the crosslinking compound (B) are reacted in a molar ratio of from 10:1 to 1:10, alternatively from 8:1 to 1:8, alternatively from 6:1 to 1:6, alternatively from 4:1 to 1:4, alternatively from 2:1 to 1:2, alternatively 1:1, (A):(B).

It will be appreciated, however, that ratios outside of the specific ranges above may also be utilized. For example, in certain embodiments, the crosslinking compound (B) is utilized in a gross excess (e.g. in an amount of alternatively alternatively ≥5, alternatively ≥10, alternatively ≥15, alternatively ≥20, times the stoichiometric amount of cross-linkable groups of the hindered organosilicon compound (A)), such as when the crosslinking compound (B) is utilized as a carrier (i.e., a solvent, diluent, etc.) during the reaction. Regardless, one of skill in the art will readily select the particular amounts and ratios of the various components to prepare the networked silicones according to the embodiments described herein, including the theoretical maximum reactivity ratios described above, the presence of any carrier vehicle(s), the particular components utilized, etc.

As introduced above, each of the hindered organosilicon compound (A), crosslinking compound (B), and catalyst (C) (when utilized) may be provided "as is", i.e., ready for the reaction to prepare the networked silicone. Alternatively, any one or more, or all, of components (A), (B), and (C) may be formed prior to or during the reaction. As such, in some embodiments, the method comprises preparing the hindered organosilicon compound (A) the crosslinking compound (B), and/or the catalyst (C). In specific embodiments, the method comprises preparing the hindered organosilicon compound (A), e.g. via reacting the initial organosilicon compound (A1) and the blocking compound (A2), optionally in the presence of the catalyst (C2).

Typically, components (A) and (B), and optionally (C), are reacted in a vessel or reactor to prepare the networked silicone. When the reaction is carried out at an elevated or reduced temperature as described below, the vessel or reactor may be heated or cooled in any suitable manner, e.g. via a jacket, mantle, exchanger, bath, coils, etc.

Components (A) and (B), and optionally (C), may be fed together or separately to the vessel, or may be disposed in the vessel in any order of addition, and in any combination. For example, in certain embodiments, components (B) and (C) are added to a vessel containing component (A). In such embodiments, components (B) and (C) may be first combined prior to the addition, or may be added to the vessel sequentially (e.g. (C) then (B)). In other embodiments, component (C) is added to a vessel containing components (A) and (B), either as a premade catalyst or as individual components to form the catalyst (C) in situ. In general, reference to the "reaction mixture" herein refers generally to a mixture comprising components (A) and (B), and optionally (C) if utilized, (e.g. as obtained by combining such components, as described above).

The method may further comprise agitating the reaction mixture. The agitating may enhance mixing and contacting together components (A), (B), and optionally (C), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., crosslinking), of the hindered organosilicon compound (A) with the crosslinking compound (B) to form the networked silicone. Other conditions may be result-effective conditions for enhancing reaction yield or minimizing amount of a particular reaction by-product included within the reaction product along with the networked silicone.

In certain embodiments, the reaction of components (A) and (B) is carried out in the presence of a carrier vehicle or solvent, such as one or more of those described above. For example, portions of carrier vehicle or solvent may be added to or otherwise combined with the hindered organosilicon compound (A), the crosslinking compound (B), and/or the catalyst (C) (when utilized) discretely, collectively with mixtures of components (A), (B) and/or (C), or with the reaction mixture as a whole. The total amount of carrier vehicle/solvent present in the reaction mixture will be selected by one of skill in the art, e.g. based on the particular component (A), (B), and/or (C) selected, the reaction parameters employed, etc.).

In certain embodiments, the reaction of components (A) and (B) is carried out in the absence of any carrier vehicle or solvent. For example, no carrier vehicle or solvent may be combined discretely with the hindered organosilicon compound (A), the crosslinking compound (B), and/or the catalyst (C) (when utilized). In these or other embodiments, none of components (A), (B), and (C) are disposed in any carrier vehicle or solvent, such that no carrier vehicle or solvent is present in the reaction mixture during the crosslinking (i.e., the reaction mixture is free from, alternatively substantially free from, solvents).

The above notwithstanding, in certain embodiments, one or both of components (A) and (B) may be a carrier, e.g. when utilized as a fluid in an amount sufficient to carry, dissolve, or disperse any other component(s) of the reaction mixture. In specific embodiments, the crosslinking compound (B) is utilized as a carrier. Additionally, it will be appreciated that the crosslinking of the hindered organosilicon compound (A) with the crosslinking compound (B) may result in the production small molecule byproducts such as water, alcohols, etc. (hereinafter the "byproducts"), which may act as a carrier in the reaction mixture. As such, the byproducts may be utilized as a carrier (i.e., once produced).

In certain embodiments, the byproducts are removed from the reaction mixture once produced. As understood in the art, some of the crosslinking reactions described above (e.g. condensations) are reversible reactions, such that removing the byproducts from the reaction mixture influences the reaction in terms of selectivity in favor, and/or overall yields, of the networked silicone (e.g. by selectively driving the equilibrium of the reaction toward that product). Removing the byproducts may include distillation, heating, applying reduced pressure/vacuum, azeotroping with solvents, utilizing molecular sieves, etc., and combinations thereof, even during the reaction.

In some embodiments, the reaction is carried out at the elevated temperature. The elevated temperature will be selected and controlled depending on the particular hindered organosilicon compound (A) selected, the particular crosslinking compound (B) selected, the reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 300° C., such as from 30 to 280, alternatively from 40 to 260, alternatively from 40 to 250, alternatively from 50 to 250, alternatively from 50 to 240, alternatively from 50 to 230, alternatively from 50 to 225, alternatively from 50 to 200, alternatively from 50 to 190, alternatively from 50 to 180, alternatively from 50 to 170, alternatively from 50 to 160, alternatively from 50 to 150, alternatively from 60 to 150, alternatively from 70 to 150, alternatively from 80 to 150, alternatively from 90 to 150, alternatively from 90 to 140, alternatively from 90 to 130, alternatively from 100 to 130, alternatively from 110 to 130, alternatively from 110 to 120° C.

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20° C. In some embodiments, the reaction is carried out at a temperature of about 0° C. (e.g. by use of an ice bath, or a circulator or chiller using ice and/or a set point of 0° C.). In some embodiments, the reaction is carried out at room temperature (i.e., from 20 to 25° C.).

In certain embodiments, the reaction is carried out at reduced pressure. The reduced pressure will be selected and controlled depending on the particular crosslinking compound (B) selected, the particular catalyst (C) selected, etc. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization, degradation, and/or decomposition byproducts). Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time during which the reaction of components (A) and (B) to prepare the networked silicone is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 240, alternatively from 2 to 120, alternatively from 2 to 96, alternatively from 2 to 72, alternatively from 2 to 48, alternatively from 3 to 36, alternatively from 4 to 24, alternatively of 6, 12, 18, 24, 36, or 48 hours, as will be readily determined by one of skill in the art (e.g. by monitoring conversion of the hindered organosilicon compound (A), production of the networked silicone, etc., such as via chromatographic and/or spectroscopic methods). In certain embodiments, the time during which the reaction is carried out is from greater than 0 to 240 hours, alternatively from 1 to 120 hours, alternatively from 1 to 96 hours, alternatively from 1 to 72 hours, alternatively from 1 to 48 hours, alternatively from 1 to 36 hours, alternatively from 1 to 24 hours, alternatively from 1 to 12 hours, alternatively from 2 to 12 hours, alternatively from 2 to 8 hours, after components (A) and (B) are combined, optionally in the presence of component (C). In specific embodiments, the time during which the reaction is carried out is from greater than 0 to 10 hours, such as from 1 minute to 8 hours, alternatively from 5 minutes to 6 hours, alternatively from 10 minutes to 4 hours, alternatively from 10 minutes to 2 hours.

Generally, the reaction of components (A) and (B) prepares a reaction product comprising the networked silicone. In particular, over the course of the reaction, the reaction mixture comprising components (A) and (B) comprises increasing amounts of the networked silicone and decreasing amounts of components (A) and (B). Once the reaction is complete (e.g. one of components (A) and (B) is consumed, no additional networked silicone is being prepared, etc.), the reaction mixture may be referred to as a reaction product comprising the networked silicone. In this fashion, the reaction product typically includes any remaining amounts of components (A) and (B), and optionally (C), as well as degradation and/or reaction products thereof (e.g. byproducts and/or other materials which were not previously removed via any distillation, stripping, etc.). If the reaction is carried out in any carrier vehicle or solvent, the reaction product may also include such carrier vehicle or solvent.

In certain embodiments, the method further comprises isolating and/or purifying the networked silicone from the reaction product. As used herein, isolating the networked silicone is typically defined as increasing the relative concentration of the networked silicone as compared to other compounds in combination therewith (e.g. in the reaction product or a purified version thereof). As such, as is understood in the art, isolating/purifying may comprise removing the other compounds from such a combination (i.e., decreasing the amount of impurities combined with the networked silicone, e.g. in the reaction product) and/or removing the networked silicone itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the networked silicone. It is to be appreciated that isolating may include, and thus may be referred to as, purifying the networked silicone. However, purifying the networked silicone may comprise alternative and/or additional techniques as compared to those utilized in isolating the networked silicone. Regardless of the particular technique(s) selected, isolation and/or purification of networked silicone may be performed in sequence (i.e., in line) with the reaction itself, and thus may be automated. In other instances, purification may be a stand-alone procedure to which the reaction product comprising the networked silicone is subjected.

As will be understood in view of the description above, the networked silicone is generally prepared with the compositions and/or as a product of the preparation method. Accordingly, the particular networked silicone prepared is a function of the particular hindered organosilicon compound (A) and the particular crosslinking compound (B) utilized.

In general, and as introduced above, the networked silicone comprises crosslinked strands of hindered organosilicon compounds with interdigitating blocking groups. More specifically, the networked silicone is prepared by crosslinking the hindered organosilicon compound (A) (e.g. prepared by reaction of the initial organosilicon compound (A1) and blocking compound (A2)) with the crosslinking compound (B). The crosslinking of the hindered organosilicon compound (A) results in a silicone network having increased chain entanglement, or properties akin thereto, from interactions between blocking groups and crosslinking groups interconnecting organosilicon strands (e.g. via interdigitation/intermeshment). The networked silicone thus formed comprises increased toughness, e.g. do to cooperative physical engagement of the blocking groups and the crosslinking groups.

A cured product is also provided. The cured product is formed from the composition. More specifically, the cured product is formed by curing the composition, e.g. via the crosslinking reaction described above. In certain embodiments, the cured product is formed by preparing a curable composition comprising the networked silicone and curing the curable composition, e.g. via reacting the networked silicone with a component of the curable composition, thereby forming the cured product.

With regard to the curable composition, the method(s) of the curing is not particularly limited, and may include any method and/or technique of curing known by those of skill in the art compatible with the networked silicone and related compositions described herein. Examples of curing methods and/or technique include photocuring, moisture curing, heat curing, crosslinking, etc.

A composite article comprising the cured product is also provided. More specifically, the composite article comprises a substrate and the cured product disposed on the substrate. The composite article is formed by disposing a networked silicone composition (i.e., the composition or the curable composition described above) on the substrate, and curing the networked silicone composition to give the cured product on the substrate, thereby preparing the composite article.

The substrate is exemplified by, for example, a component of a functional device. The particular type and nature of the functional device is not particular limited, and may be any kind of optical, electrical, and/or electronic device, such that the component may comprise, or be utilized in devices containing, a waveguide, electrical circuit, electrode, etc. Particular examples of functional devices include: optical devices; photoelectric devices; photo mechanic devices; photomagnetic devices; electrical and/or electronic devices; electro-optical devices; mechanical devices; electromechanical devices including a micro-electromechanical system; magnetic devices; photo-electro-magnetic devices; mechanomagnetic devices; thermal devices; thermo-mechanical devices; thermo-optical devices; thermo-electric and/or thermo-electronic devices; thermo-magnetic devices; and the like, as well as derivatives, modifications, and combinations thereof. As will be appreciated by those of skill in the art, the composite article itself may also be a component of a functional device, such as any of those described above. Examples of components includes building components (e.g. windows, walls, roofs, ceilings, floors, counters, etc.), automotive components (e.g. headlights, etc.), extruded hoses, waveguides, food storage vessels, wearables, sealants, printed circuit boards, telephones, sensors (e.g. temperature sensors, pressure sensors, accelerometers, etc.).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples, illustrating embodiments of this disclosure, are intended to illustrate and not to limit the invention.

General Preparation Procedure 1: Preparation of a Hindered Organosilicon Compound An Initial Organosilicon Compound (A1) is combined with a Blocking Compound (A2) and a Carrier Vehicle under atmospheric conditions to prepare a solution. A Catalyst (C2) is then added to the solution, and the solution stirred to prepare a Hindered Organosilicon Compound.

General Preparation Procedure 2: Preparation of a Hindered Organosilicon Compound An Initial Organosilicon Compound (A1) is combined with a Catalyst (C2) and a Carrier Vehicle under atmospheric conditions to prepare a solution. A Blocking Compound (A2) is then added to the solution, and the solution stirred to prepare a Hindered Organosilicon Compound.

General Procedure 1: Preparation of a Networked Silicone

A mixture of a Hindered Organosilicon Compound (A) and a Carrier Vehicle is charged with a Crosslinking Compound (B), followed by a Catalyst (C), to give a reaction mixture. The reaction mixture is mixed, transferred to a container, and cured to prepare a Networked Silicone.

General Procedure 2: Preparation of a Networked Silicone

A Crosslinking Compound (B) is added to a solution of a Hindered Organosilicon Compound (A) and a Carrier Vehicle. The Carrier Vehicle is then removed from the solution under vacuum and a Catalyst (C) is then added to give a reaction mixture. The reaction mixture is mixed and disposed onto a release film lining a container. The container is then transferred to a vacuum oven, and the reaction mixture cured at room temperature for 24 hours and then post-cured at an elevated temperature (120° C.; 30 min) to prepare a Networked Silicone.

The invention claimed is:

1. A composition for preparing a networked silicone, the composition comprising:
(A) a hindered organosilicon compound comprising a siloxane moiety having the general formula (I):

[R³₃SiO₁/₂]ₐ[R²R³SiO₂/₂]ᵦ[R¹SiO₃/₂]ᵤ (I),

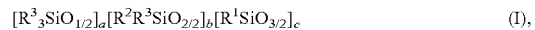

where each R¹ is an independently selected hydrocarbyl group; each R² is independently R¹ or a blocking group comprising a branched organosilicon group comprising a carbosiloxane dendrimer and having from 3 to 1000 silicon atoms, with the proviso that at least one R² is the blocking group; each R³ is independently R¹ or a cross-linkable group, with the proviso that at least one R³ is the cross-linkable group; and subscripts a, b, and c are each mole fractions such that a+b+c=1, with the provisos that 0≤a<1, 0<b≤1, and 0≤c<1; and
(B) a crosslinking compound having the general formula R⁶-L-R⁶, where L is a linking group and each R⁶ is an independently selected functional group reactive with the cross-linkable group R³ of the hindered organosilicon compound (A); and, optionally,
(C) a catalyst.

2. The composition of claim 1, wherein the carbosiloxane dendrimer has the formula:

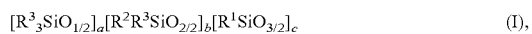
-[D]ₚ—Si(R⁴)₃₋q(-[D]ₚ—Si(L)q(R⁴)₃₋q')q, where each D is an independently selected divalent linking group, each R⁴ is independently R¹ or OR¹, each L is independently R⁴ or an organosilicon group, each subscript p is 0 or 1, subscript q is 1, 2, or 3, subscript q' is 0, 1, 2, or 3, and R¹ is a hydrocarbyl group.

3. The composition of claim 1, wherein the cross-linkable group R³ comprises a functional group that is: (i) hydrosilylatable and reactive with one of the R⁶ groups; (ii) condensable; (iii) displaceable; (iv) nucleophilic; or (v) a combination of two or more of (i)-(iv).

4. The composition of claim 1, wherein linking group L comprises: (i) a siloxane moiety; (ii) an organic moiety; or (iii) both (i) and (ii).

5. The composition of claim 1, wherein each functional group R⁶ is: (i) hydrosilylatable and reactive with one of the R³ groups; (ii) condensable; (iii) nucleophilic; (iv) displaceable; or (v) a combination of two or more of (i)-(iv).

6. The composition of claim 1, further comprising: (i) a carrier; (ii) a filler; (iii) a filler treating agent; (iv) a surface modifier; (v) a surfactant; (vi) a rheology modifier; (vii) a viscosity modifier; (viii) a binder; (ix) a thickener; (x) a tackifying agent; (xi) an adhesion promotor; (xii) a defoamer; (xiii) a compatibilizer; (xiv) an extender; (xv) a plasticizer; (xvi) an end-blocker; (xvii) a reaction inhibitor; (xviii) a drying agent; (xix) a water release agent; (xx) a colorant; (xxi) an anti-aging additive; (xxii) a biocide; (xxiii) a flame retardant; (xxiv) a corrosion inhibitor; (xxv) a catalyst inhibitor; (xxvi) a UV absorber; (xxvii) an antioxidant; (xxviii) a light-stabilizer; (xxix) a catalyst, procatalyst, or catalyst generator; (xxx) an initiator; (xxxi) a photoacid generator; (xxxii) an acid acceptor; (xxxiii) a heat stabilizer; or (xxxiv) a combination of two or more of (i)-(xxxiii).

7. A method of preparing a networked silicone, the method comprising:
reacting (A) a hindered organosilicon compound and (B) a crosslinking compound, optionally in the presence of (C) a catalyst, to give the networked silicone;
wherein the hindered organosilicon compound (A) comprises a siloxane moiety having the general formula (I):

[R³₃SiO₁/₂]ₐ[R²R³SiO₂/₂]ᵦ[R¹SiO₃/₂]ᵤ (I),

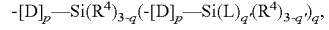

where each R¹ is an independently selected hydrocarbyl group; each R² is independently R¹ or a blocking group comprising a branched organosilicon group comprising a carbosiloxane dendrimer and having from 3 to 1000 silicon atoms, with the proviso that at least one R² is the blocking group; each R³ is independently R¹ or a cross-linkable group, with the proviso that at least one R³ is the cross-linkable group; and subscripts a, b, and c are each mole fractions such that a+b+c=1, with the provisos that 0≤a<1, 0<b≤1, and 0≤c<1; and
wherein the crosslinking compound (B) has the general formula R⁶-L-R⁶, where L is a linking group and each R⁶ is an independently selected functional group reactive with the cross-linkable group $R^3$ of the hindered organosilicon compound (A).

8. The method of claim 7, wherein the hindered organosilicon compound (A) has the formula $[Y]_x[Z]_y$, where each Y is an independently selected siloxane moiety with the proviso that at least one siloxane moiety Y has the general formula (I), each Z is an independently selected polymeric organic moiety, and subscripts x and y are each mole fractions such that x+y=1, with the provisos that $0<x\leq 1$ and $0\leq y<1$.

9. The method of claim 8, further comprising preparing the hindered organosilicon compound (A) by reacting (A1) an initial organosilicon compound and (A2) a blocking compound, optionally in the presence of (C2) a catalyst, to give the hindered organosilicon compound (A).

10. A networked silicone prepared according to the method of claim 7.

11. A cured product of the composition of claim 1.

12. A composite article comprising a substrate and a networked silicone composition disposed on the substrate, wherein the networked silicone composition comprises the cured product of claim 11.

13. A method of forming a composite article comprising a networked silicone, said method comprising:
disposing a composition on a substrate; and
curing the composition to give the networked silicone on the substrate, thereby forming the composite article;
wherein the composition is the composition of claim 1.

14. A composite article formed according to the method of claim 13.

15. The composite article of claim 12, wherein the substrate comprises a component of a functional device.

16. The composite article of claim 15, wherein the functional device is: (i) an optical device; (ii) a photoelectric device; (iii) a photo mechanic device; (iv) a photomagnetic device; (v) an electrical or electronic device; (vi) an electro-optical device; (vii) a mechanical device; (viii) an electro-mechanical device including a micro-electromechanical system; (ix) a magnetic device; (x) a photo-electro-magnetic device; (xi) a mechanomagnetic device; (xii) a thermal device; (xiii) a thermo-mechanical device; (xiv) a thermo-optical device; (xv) a thermo-electric or thermo-electronic device; (xvi) a thermo-magnetic device; or (xvii) a combination of two or more of (i) to (xvi).

17. The composition of claim 1, wherein each $R^2$ is independently $R^1$ or a blocking group comprising a branched organosilicon group having from 4 to 90 silicon atoms, with the proviso that at least one $R^2$ is the blocking group.

* * * * *